United States Patent [19]
Dooling et al.

[11] Patent Number: 5,878,424
[45] Date of Patent: Mar. 2, 1999

[54] METHOD AND APPARATUS FOR INDEXING PATTERNED SPARSE ARRAYS FOR MICROPROCESSOR DATA CACHE

[75] Inventors: Daria Rose Dooling, Jericho, Vt.; Lenore Marie Restifo Mullin, Loudonville, N.Y.; David Erin Moran, South Burlington, Vt.

[73] Assignee: International Business Machines Corporation, Armonk, N.Y.

[21] Appl. No.: 590,648

[22] Filed: Jan. 24, 1996

[51] Int. Cl.$^6$ .................................................. G06F 17/30
[52] U.S. Cl. .................... 707/102; 707/104; 364/725.02; 364/754.02
[58] Field of Search ................................... 707/102, 104; 364/725.02, 754.02

[56] References Cited

U.S. PATENT DOCUMENTS

| | | | |
|---|---|---|---|
| 4,447,886 | 5/1984 | Meeker | 364/725.01 |
| 4,914,615 | 4/1990 | Karmarkar et al. | 364/754.02 |
| 4,918,742 | 4/1990 | Simonds | 382/304 |
| 5,099,447 | 3/1992 | Myszewski | 364/754.02 |
| 5,206,822 | 4/1993 | Taylor | 364/754.02 |
| 5,379,393 | 1/1995 | Yang | 711/3 |
| 5,781,779 | 7/1998 | Gilbert et al. | 395/707 |

*Primary Examiner*—Wayne Amsbury
*Attorney, Agent, or Firm*—Whitham, Curtis & Whitham; Richard Kotulak, Esq.

[57] ABSTRACT

A method and apparatus for storing and accessing a patterned array of data for a storage device, includes inputting the array, an upper bandwidth and a lower bandwidth, defining a band within the array based on the upper bandwidth and the lower bandwidth, areas of the array outside the band contain zero value data elements. The upper bandwidth, the lower bandwidth and data within the band are stored in the storage device, and the array is reproduced based on the upper bandwidth the lower bandwidth and the data within the band.

21 Claims, 13 Drawing Sheets

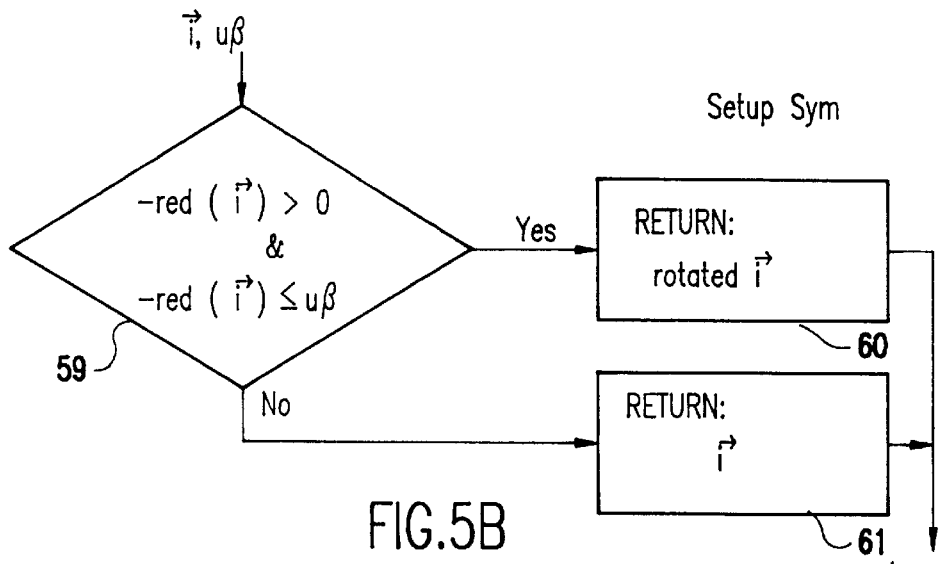

FIG. 5B

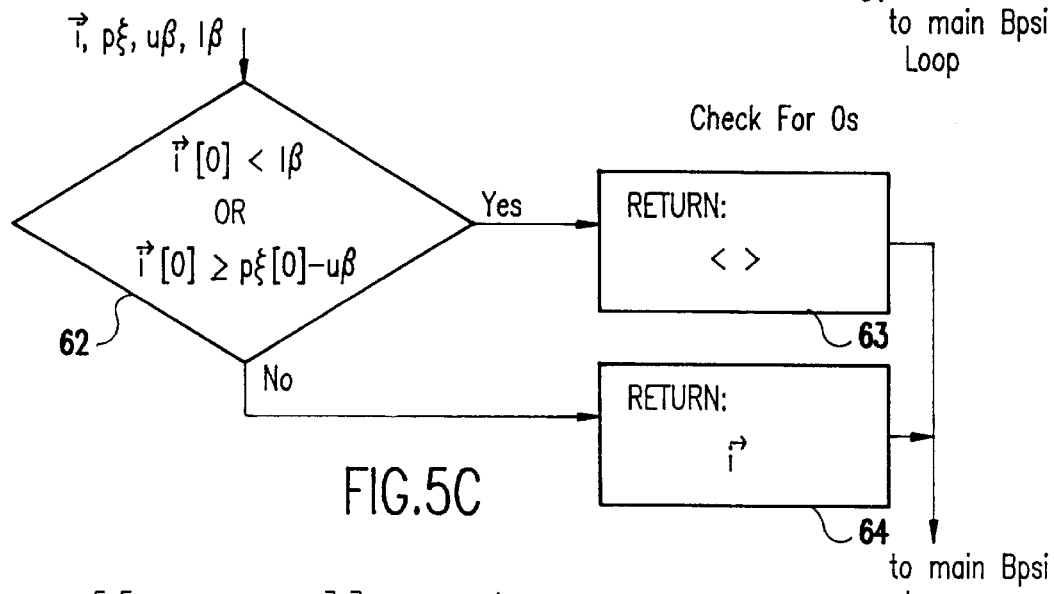

FIG. 5C $$\xi = \begin{bmatrix} \begin{bmatrix} 1 & 2 & 3 & - \\ 5 & 6 & 7 & 8 \\ - & 10 & 11 & 12 \end{bmatrix} \\ \begin{bmatrix} 13 & 14 & 15 & - \\ 17 & 18 & 19 & 20 \\ - & 22 & 23 & 24 \end{bmatrix} \end{bmatrix}$$

and $\vec{i} = <1\ 2\ 2>$ index
$p\xi = <2\ 3\ 4>$ shape
$u\beta = 2$
$l\beta = 1$ } structure
$s = 0$

FIG. 5E $\xi = 23$
$\vec{i} = <\ >$
$p\xi = <\ >$
$u\beta = 0$
$l\beta = 0$
$s = 0$

FIG. 5G $\xi = \begin{bmatrix} 13 & 14 & 15 & - \\ 17 & 18 & 19 & 20 \\ - & 22 & 23 & 24 \end{bmatrix}$ and $\vec{i} = <2\ 2>$
$p\xi = <3\ 4>$
$u\beta = 2$
$l\beta = 1$
$s = 0$

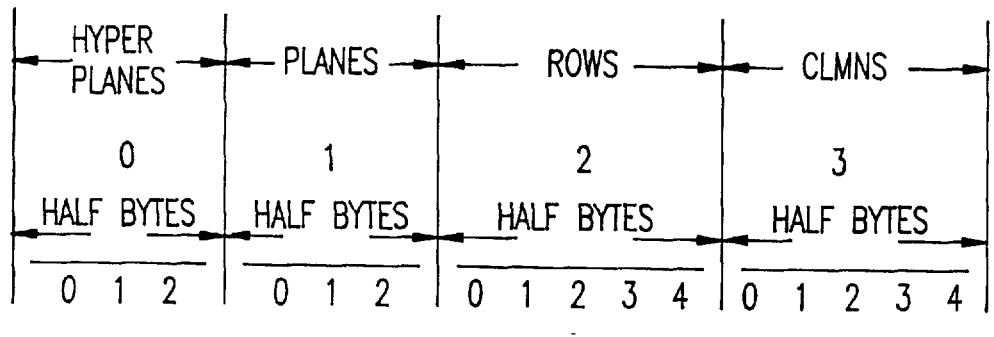
FIG.14A
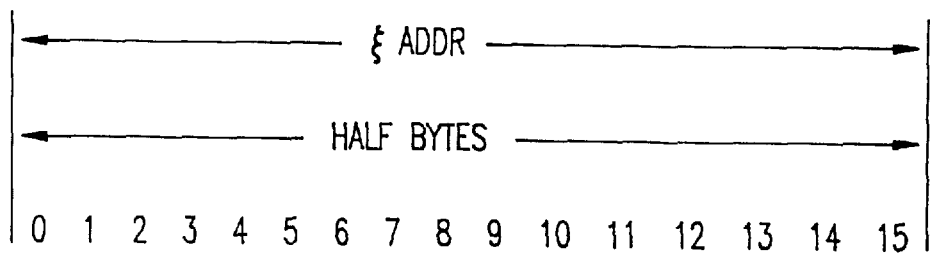
FIG.14B
| 0 | 0 | 1 | 2 | 3 | 4 | 0 | 1 | 2 | 3 | 4 |
|---|---|---|---|---|---|---|---|---|---|---|
| s | $\mu\beta$ | | | | | $l\beta$ | | | | |
FIG.14C

METHOD AND APPARATUS FOR INDEXING PATTERNED SPARSE ARRAYS FOR MICROPROCESSOR DATA CACHE

BACKGROUND OF THE INVENTION

1. Field of the Invention

The present invention generally relates to a method and apparatus for addressing multidimensional numerical arrays using fixed overhead resources and more specifically to a method and apparatus for accessing very large, general banded numerical arrays with reduced data storage and formatting requirements. Moreover, the invention is for use as a data cache address generator that decreases the processing time of general banded numerical arrays.

2. Description of the Related Art

The workstation and its microprocessor data cache memory are used in a variety of scientific and engineering applications involving very large general banded numerical arrays. For purposes of this application, "very large general banded numerical arrays" are defined as linear systems of equations with hundreds, or more, unknowns where non-zero coefficients are clustered around the diagonal. Current storage methods for these arrays require relatively large amounts of memory capacity.

A microprocessor typically includes one or more fixed- and floating-point data processors and one or more instruction and data caches, all of which are implemented using one or more integrated circuits (ICs), as shown in FIG. 10.

FIG. 10 shows the five major subassemblies of a microprocessor according to the prior art: the central processing unit 10 (CPU), the data cache 11, the instruction cache 12, the system bus 13, and the memory 14. Addresses are transferred along the CPU address bus 19 and data is transferred along the CPU data bus 20. The CPU 10 has one or more fixed point arithmetic logic units (ALUs, not shown) and one or more floating-point arithmetic units (not shown). The instruction address and data address are maintained by the fixed-point processor.

In high performance computers, caches serve to reduce the observed latency to memory. The cache provides a relatively small but high performance memory close to the processor. The data cache is a local microprocessor memory that stores/retains relatively recent operands (e.g., a predetermined number of the most recent operands) and improves microprocessor performance by reducing the need to access (i.e., read or write) the more remote system memory (which typically consumes many microprocessor cycles). Instead of accessing the remote system memory, access can simply be made to the data cache (e.g., typically within one or at most several machine cycles), thereby reducing processing time, as shown in FIGS. 11a and 11c.

The data cache 11 provides copies of data within the memory 14 to the CPU 10. The data cache 11 includes the data cache directory and control 15 (DIR and CNTRL). Both the data cache 11 and the data cache directory and control 15 are random access memories (RAMs). The data cache 11 holds the data. The directory and control 15 holds the address of the data currently in the data cache 11. Variables currently used by the CPU 10 are located in the data cache 11. The contents of the data cache 11 can be stored back to system memory 14 after use.

The instruction cache 12 provides copies of instructions from memory 14 to the CPU 10. The instruction cache 12 includes the instruction cache directory and control 16. The contents of the instruction cache 12 usually are not stored back to system memory 14 since the instructions are not modified by the CPU 10.

The system bus 13 is the electrical connection to the memory 14. The system bus is divided into a data bus 13a, an address bus 13b and a control bus 13c, all having multiple signal lines. Unidirectional buffers 17 and bi-directional buffers 18 prevent interference between the data cache 11 and the instruction cache 12 when either are accessing memory 14. The buffers 17, 18 are controlled by the cache directory and control units 15,16.

FIG. 11(a) shows a "read-hit" cache operation, which occurs when the CPU 10 executes a load register instruction:

$$R \leftarrow [MEM (ADDR)] \qquad \{EQ\ 1\}$$

where the left hand side R is a CPU register, and [MEM (ADDR)] is the data from memory as pointed to by the CPU supplied address (ADDR).

FIG. 12 shows the format of a typical address request that may be issued by the CPU 10. The address request appears on the CPU address bus 19 and includes "set bits" and "tag bits" as shown in FIG. 12. The directory and control unit 15 monitors the set bits that appear in the address on the address bus 19 to determine if they match the set bits of the directory and control unit 15. The tag bits contain address information of the associated data that is stored in the cache. If the directory and control unit 15 match the set bits on the address bus to those in the directory, then the data associated with these set bits is stored in the cache and the tag bits provide a cache address of that data. If the set bits on the address bus do not match those in the directory and control unit 15, then the related data is not in the cache.

In the case of a read hit, the set bits in a load request from the CPU 10 match set bits within the directory and control unit 15. After such a match, directory and control 15 disables the address buffers for the system bus, and enables the data cache 11 to load a register within the CPU 10. The register load operation for a read-hit is $$R \leftarrow [MEM (ADDR)]_{CACHE} \qquad \{EQ\ 2\}$$

where R is a CPU register and $[MEM(ADDR)]_{CACHE}$ is the data available in the cache at the CPU supplied address (ADDR).

FIG. 11(b) shows a "read miss", where set bit entries in the directory and control 15 do not match the address of the load request shown in Equation 1. In this case, the system bus address buffers are enabled, and the memory provides the data for the CPU register.

Normally, several data elements are read from memory 14 or the data cache 11, starting from the address provided by the CPU 10. This set of data elements is referred to as a "line" of data. The directory and control 15 configures the bi-directional data buffers to receive the incoming data, signals the CPU 10 to load the register with the first incoming data element along with the remainder of the data into the data cache 11. The directory and control 15 also records the set bits and tag bits for the first data element in the line. Thus, the register load operation for a read miss is $$R \leftarrow [MEM (ADDR)]_{MEMORY} \qquad \{EQ\ 3\}$$

FIG. 11(C) shows a "write hit", where the set bits in a store request from the CPU 10 match set bits within the directory and control unit 15. After such a match, directory and control 15 enables the address buffers for the system bus, and enables the data cache and memory to store the contents of the CPU register 10. This process is referred to as a "write-through" operation where both the data cache memory and main memory are updated. This operation can be denoted as $$[MEM(ADDR)]_{MEMORY} \leftarrow R$$

and, $$[MEM(ADDR)]_{CACHE} \leftarrow R \qquad \{EQ\ 3.1\}$$

FIG. 11(d) shows a "write miss". Since the directory and control 15 does not have set bits correlating to the register store operation, the data is written only to the system memory 14. This is denoted as $$[MEM(ADDR)]_{MEMORY} \leftarrow R \qquad \{EQ\ 3.2\}$$

Data from the much larger, and slower, main memory is automatically staged into the cache on a demand basis, as shown in FIG. 11(b). If the program running on the computer exhibits good locality of reference in the main memory address space, most of the accesses by the processor are satisfied from the cache, and the average memory access time seen by the processor is close to that of the cache (e.g., on the order of one to two cycles). When the processor does not find the requested data in the cache, it incurs a "cache miss penalty", which is a longer access time to the main memory.

For a given cache structure, a program can be characterized by its "cache hit ratio" (CHR) which is the fraction of the accesses that are satisfied from the cache and hence do not suffer the longer latency to main memory. Compressing data improves the CHR and overall microprocessor performance by allowing more of the needed data to fit in the data cache.

Turning now to arrays, a sparse matrix is a two dimensional array that has few non-zero entries relative to the number of zero entries. The zero entries represent the zero coefficients of the linear system, whereas the non-zero entries in the matrix represent coefficients that have a non-zero value. A "band array" is a special type of sparse array where all non-zero elements are contained between two symmetric lines drawn parallel to the diagonal.

FIG. 6 illustrates a conventional band array. The band array contains entries that are zero entries that do not perform a useful function, but consume memory space that could be used for other purposes. This problem creates inefficiencies by unnecessarily using increased memory space and thereby reducing overall speed of the microprocessor.

To solve problems represented by band arrays efficiently, space and time requirements must be minimized. Current storage methods for general band arrays consume a relatively large amount of memory.

The BLAS, or Basic Linear Algebra Subprograms, storage method is illustrated in FIG. 7. In this method, each diagonal in the original matrix becomes a row in the transformed matrix. The BLAS are a set of industry standard Fortran subroutines that perform linear algebra operations. The asterisks shown in FIG. 7 are unused positions that must be stored in order to maintain the regularity of the matrix structure. Therefore, the storage overhead for this method is proportional to the size of the array. The BLAS storage method does not scale to an arbitrary number of dimensions, N.

Different storage representations are needed for different types of band arrays. For example, a dense array represented in the BLAS scheme requires almost twice the memory actually needed to represent all the non-zero array elements.

Therefore, different storage schemes are used for various type of arrays (i.e. banded, triangular, dense), and different programs must be written to handle each different type of array. Further, prior to this invention, there was no general, scalable, uniform method to operate on any N-dimensional band array.

The conventional systems do not provide a formally-stated patterned sparse array indexing method that promotes automated handling of array operations (i.e., array operations which are optimized by the compiler for either local or distributed processing).

Moreover, prior to this invention, there was no efficient hardware address generator method that allowed high-speed patterned sparse array processing. Also, prior to this invention, there was no general, scalable method for addressing compressed multi-dimensional patterned sparse arrays.

SUMMARY OF THE INVENTION

In view of the foregoing problems of the conventional banded array addressing systems, an object of the present invention is to minimize the storage space required for all forms of band arrays.

Another object of this invention is to provide a general, scalable uniform method to operate on any N-dimensional band arrays.

Yet another object is to provide a formally stated patterned sparse array indexing method and structure that promotes automated handling of array operations (i.e., array operations which are optimized by the compiler for either local or distributed processing).

A fourth object of the present invention is to provide a hardware address generator and method that reduces patterned sparse array processing time.

One embodiment of the present invention includes a method and apparatus for reading and writing (i.e., accessing) a patterned sparse array of data for use with a storage device. The method includes storing the non zero elements of the array, an upper bandwidth, a lower bandwidth, and the shape of the array, or the number of elements in each dimension of the array. This information defines the band of the array, wherein areas of the array outside the band contain zero value data elements. The method also includes the storing the upper bandwidth, the lower bandwidth, the shape of the array and the data within the band in a storage device, and reproducing the array based on the upper bandwidth the lower bandwidth, the shape of the array and the data within the band. The apparatus includes a means for inputting array structural information, a means for defining a band of the array, wherein areas of the array outside the band contain zero value data elements, a means for storing the band and a means for reproducing the array, based on the band and the structural information.

With the structural information and method of the invention, the data processing time is reduced by the apparatus producing addresses to promote a more efficient use of cache memory and the central processing unit. The invention minimizes memory storage requirements and, because the sparse array address calculation is predictable, the exact address may be prefetched to improve the data cache hit ratio and addressing efficiency.

BRIEF DESCRIPTION OF THE DRAWINGS

The foregoing and other objects, aspects and advantages will be better understood from the following detailed description of a preferred embodiment of the invention with reference to the drawings, in which:

FIGS. 5(a)–(d) are a flowchart representative of the inventive method.

FIGS. 5(e), (f) and (g) are examples of the index loop of flowchart 5(a) to illustrate the present invention.

FIG. 6 illustrates a band array according to the prior art.

FIG. 7 illustrates a transformed band array in accordance with the prior art.

FIGS. 14(a)–14(c) illustrate examples of format fields of an index register, an address pointer, a shape vector and a structure register.

DETAILED DESCRIPTION OF A PREFERRED EMBODIMENT OF THE INVENTION

Figures 1, 2, 3, 4:
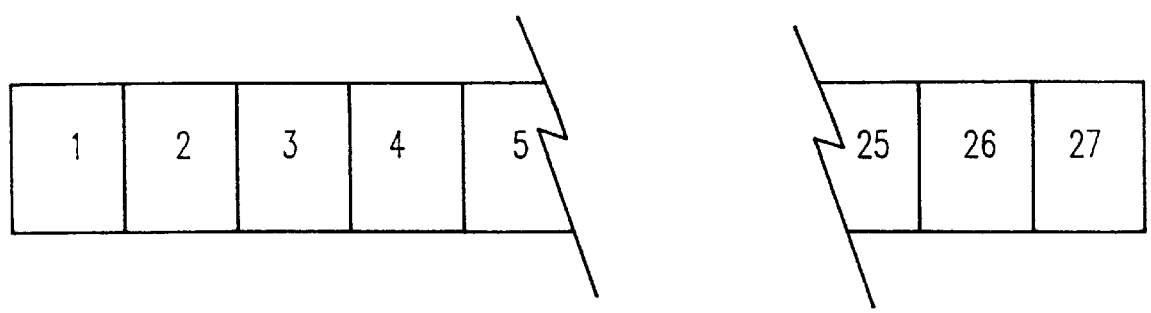
FIG. 1 illustrates data cache memory locations of the band array of FIG. 6 in accordance with the present invention.
FIG. 2 illustrates data cache memory locations of the band array of FIG. 6 in accordance with the prior art.
FIG. 3 illustrates a shape vector, an upper half-bandwidth and a lower half-bandwidth of the band array of FIG. 6 in accordance with the present invention.
FIG. 4 is a block diagram of computer memory locations in accordance with the present invention.

The present invention provides a method and apparatus for reading and writing patterned sparse arrays. In one embodiment, the invention utilizes a function called Bpsi (Banded psi) and can be implemented in hardware as a microprocessor data cache address co-processor or in software as a patterned sparse array index manager.

Bpsi is a dimension independent band array index function that calculates an array address based on the shape of the array, an upper half-bandwidth, a lower half-bandwidth, and a symmetric indicator. The Bpsi function is a scalable band array data compression method whereby only non-zero array elements are stored in a storage device.

In the invention, all types of band arrays (tridiagonal, triangular, general band, dense) are stored in one uniform representation. The band array elements of each type of array are stored in contiguous row major order. Additionally, a shape vector and bandwidth properties are defined for each different type of array stored. Therefore, each type of array is represented in the same way and with the same structural identifiers.

Programs that access the patterned sparse array through the inventive index function, Bpsi, are removed from the complexity of managing the sparsity of the array. The index allows retrieval of data from memory without accessing the zero values, thereby saving processing time and memory space.

With the present invention, only the band elements are stored. Zeros outside the band are not stored. A novel feature of the present invention is recognizing the inherent structural information of the array, namely the shape, along with the bandwidth and symmetric information to transform array accesses into memory address offsets.

The storage overhead for the method according to the present invention is a constant of the length of the shape vector+2 (the bandwidth parameters)+1 (the symmetric indicator). This operation is a significant improvement over the prior art where the storage overhead is proportional to the size of the array plus the storage needed to transform the array into the BLAS format as described in the Background section.

Specifically, the inventive method includes a step of specifying the shape of the array or, stated another way, specifying the number of elements in each dimension of the array. Once the shape of the array is defined, the next step of the inventive method is to define the area within the band. This area is determined by the horizontal and vertical measures of the band of the array. These measures are identified as the upper half bandwidth (the horizontal number of positions, i.e. columns, from the diagonal to the edge of the band) and the lower half bandwidth (the vertical number of positions, i.e. rows, from the diagonal to the edge of the band).

Next, the array is checked for symmetry. A symmetric array is an array where one side mirrors the other side along the diagonal. In a symmetric array the values and shape are the same on both sides of the diagonal. If the array is symmetric, the inventive method only stores the upper half of the array, and only calculates the upper half bandwidth, thus reducing storage requirements.

Once the size and location of the band is established, only the data within the band is stored in memory. The information defining the band is also retained to allow the array, both inside and outside the band, to be completely reproduced.

Referring to the drawings. FIG. 1 illustrates a portion of the array of FIG. 6 as it is stored in cache. Specifically, FIG. 1 illustrates that, according to the invention, the three zeros that follow the number 3 and precede the number 4 have been eliminated. Similarly, zeros between numbers 7 and 8 in FIG. 6 have been eliminated. Thus, less memory storage space is required since the zeros are not stored.

In contrast, FIG. 2 illustrates a row of cache memory storing the array of FIG. 7 according to the prior art. Notice three wasted cache locations in FIG. 2. With the inventive method, the cache memory is utilized more efficiently.

FIG. 3 illustrates the storage of the shape of the array followed by the upper half-bandwidth and lower half-bandwidth which, as discussed above, defines of the array. As also discussed above, the "upper half-bandwidth" is the horizontal number of positions (i.e., columns) from the diagonal to the edge of the band, whereas the "lower half-bandwidth" is the vertical number of positions (i.e., rows) from the diagonal to the edge of the band.

FIG. 4 illustrates a complete storage of the array shown in FIG. 6 according to the present invention.

FIGS. 5(a)–(d) are a flowchart of the inventive index process. For a given use of the Bpsi function, the flow "loops" until the index vector is reduced to a null vector from its initial call value. Each loop reduces the index vector and the corresponding dimension of the array by one.

Figure 5A:
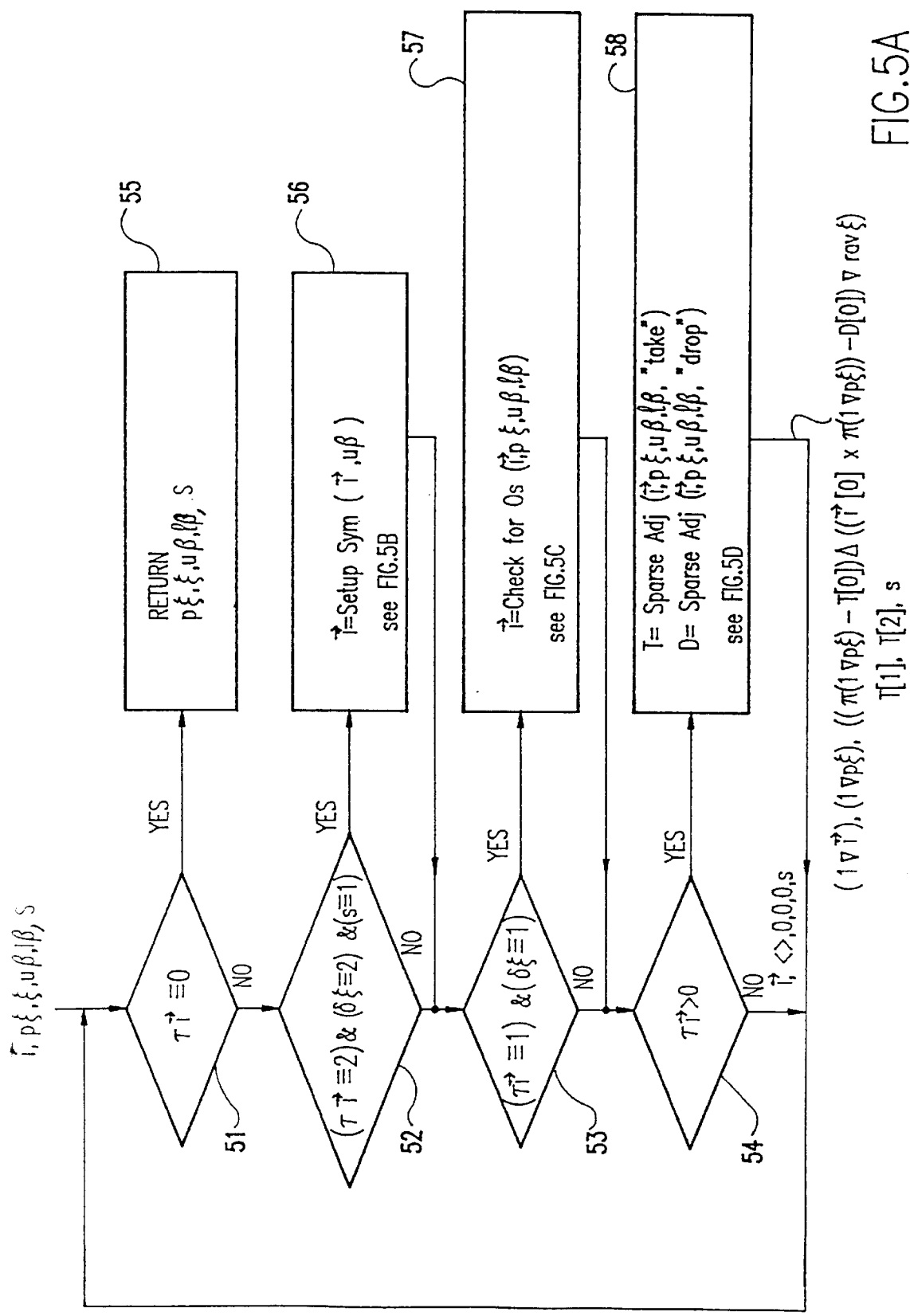

FIG. 5(a) contains four decision blocks 51–54 that represent the highest level of Bpsi logic. The index vector (î), the shape vector (ρξ), the array (ξ), the upper half-bandwidth (μβ), the lower half-bandwidth (lβ), and the symmetric indicator (s) are the inputs and are shown at the top of FIG. 5(a).

Decision block 51 determines if the index vector is empty, which is the terminating condition for the algorithm. An empty index vector means that all dimensions of the array have been processed and the indexed result is available. The Bpsi algorithm loops until the index vector becomes empty. If the index vector is empty decision block 51 results in a "yes" and function block 55 returns the variables shown. If decision block 51 results in a "no", the algorithm continues to decision block 52.

If the input array is a symmetric array, only one-half of the symmetric array is stored to further conserve memory. Since only one-half of the array is stored, the index vector must be rotated to reproduce non-stored elements (i.e., the mirror elements in the lower half of a symmetric array) if an element from the lower half of the symmetric array is requested. Decision block 52 determines whether the index vector is a candidate for the rotation check of block 56 and FIG. 5(b). If an element from the lower half of the symmetric array is requested, the index vector is accessing a non-stored element in the array, and the index vector is rotated to access the stored mirror value.

Decision block 52 determines whether the index vector is a candidate for the rotation check by testing that the number of elements in the index vector is two, that the dimensionality of the array is two, and the symmetric indicator for a value of "1", indicating a symmetric array. If the array is symmetric, then decision block 52 produces a "yes" result and calls function block 56. If not, processing continues to decision block 53.

The processing of function block 56 is shown in detail in FIG. 5(b). More specifically, decision block 59 illustrates testing the index vector using minus reduction (against 0 and the upper bandwidth) to determine if the index vector should be rotated. Minus reduction sequentially subtracts all values in the index vector. An example of minus reduction follows. If the index vector is <6 5> then the minus reduction of the index vector equals 1. If the result of the minus reduction calculation is greater than zero and less than or equal to the upper bandwidth, decision block 59 results in a "yes" and calls function block 60 to rotate the vector. If decision block 59 results in a "no", function block 61 returns the unchanged index vector and processing continues to decision block 53.

Function block 60 of FIG. 5(b) illustrates that the index vector is rotated. For example, the index vector <2 3>, when rotated is <3 2>. Then processing continues to decision block 53.

Decision block 53 determines if the array is one dimensional and indexed by a vector of shape 1 by checking whether the number of elements in the index vector and the number of elements in the shape vector are equal to 1. If the index vector and the shape vector have one element, then decision block 53 produces a "yes" and calls function block 57. If decision block 53 produces a "no" processing continues to decision block 54.

Decision block 62 of FIG. 5(c) checks to see if a non-stored element is accessed by testing the index vector to determine whether the value of the index vector is outside the upper and lower bandwidths. Specifically, the 0th element of the index vector is compared to see if it is less than the lower bandwidth or whether it is greater than or equal to the 0th element of the shape vector less the upper bandwidth. If the index vector does not meet either of these conditions, decision block 62 produces a "no" and block 64 returns the unchanged index vector. Processing continues. If the index vector meets either of these conditions, it is accessing an element outside the band (i.e., a non-stored element). In this case, block 63 returns an empty vector for the index vector.

For example, if the array is a vector, the lower bandwidth lβ is the number of non-stored elements to the left of the band of vector elements and the upper bandwidth μβ is the number of non-stored elements to the right of the band of vector elements. If a non-stored element is accessed, block 57 of FIG. 5(a) returns an empty index vector. This causes the test in decision block 54 to be false. Thus the scalar 0 is returned with an empty shape and μβ=lβ=0. The main Bpsi loop terminates and a zero is returned with the correct shape and bandwidth parameters.

Decision block 54 determines if there is processing left based on the number of elements remaining in the index vector. If the index vector is not empty, then block 58 and the algorithm shown in FIG. 5(d) is called.

Figure 5D:
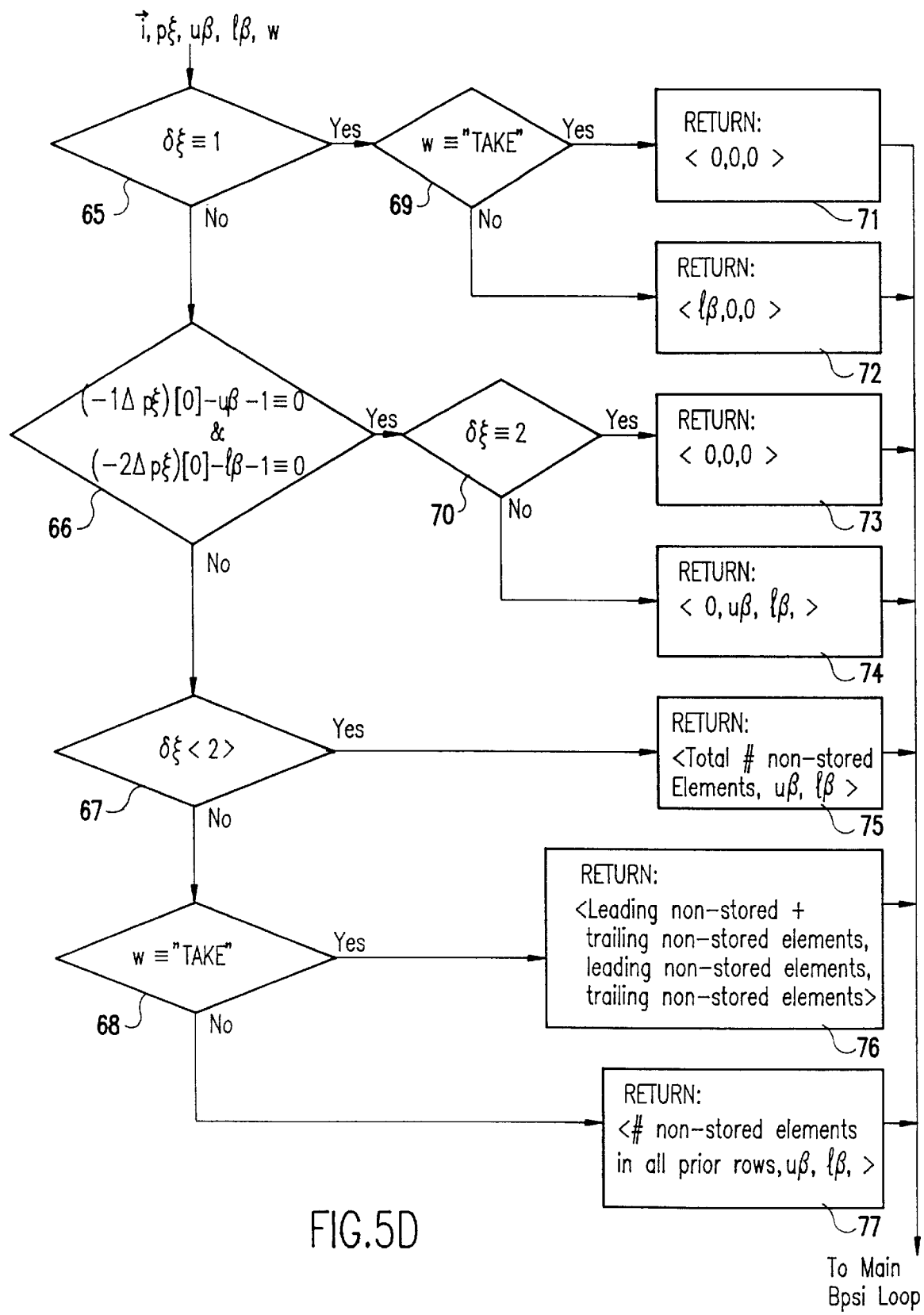

The algorithm shown in FIG. 5(d) calculates how many non-stored elements there are before the sub-array that is requested. All sub-arrays prior to the one requested are "dropped" and the requested one is "taken". When a sub-array is dropped, the array pointer is advanced beyond the dropped sub-array. The sub-array that is taken is the sub-array accessed from the data cache. For example, the 3-D array ξ of FIG. 13 with an index vector î=<1> "drops" the 0th plane of the array ξ and "takes" the 1st plane with an origin of 0. All examples given herein have an origin of zero. So sub-array

```
1  2  3  —
5  6  7  8
—  10 11 12
``` is the one item dropped from the 0th plane of array ξ shown in FIG. 13, and the following sub-array is the 1st item taken from the 0th plane of ξ.

```
12 13 14  —
16 17 18 19
—  21 22 23
```

The algorithm of FIG. 5(d) is called twice, first to calculate the number of non-stored elements in the "taken" subarray and second to calculate the number of non-stored elements in the "dropped" sub-array.

Decision block 65 determines whether the array is a vector by comparing its dimensionality to 1. If the array is a vector, then the result of the main Bpsi loop is a scalar. By definition, the upper bandwidth and lower bandwidth equal zero (μβ=lβ=0) for a scalar. Thus, if decision block 65 determines that the array is a vector, it produces a "yes" and calls function block 69 which results in a "yes" since the first invocation is a "take". Function block 71 returns three zeros.

When one element is "taken" (i.e., a "yes" in decision block 69), no adjustment for non-stored elements is made. This is represented as a 0 returned for the first value in function block 71 and shown at the bottom of FIG. 5(a) as T[0]. The next two zeros returned update the values of the upper bandwidth and lower bandwidth prior to the next iteration of the main Bpsi loop as shown at the bottom of FIG. 5(a) by T[1] and T[2] respectively.

On a "drop" (a "no" in decision block 69 during the second invocation of algorithm 5(d)), the number of leading non-stored elements of the vector is returned, as shown in function block 72, as the first element of the return vector, or as D[0] at the bottom of FIG. 5(*a*). The number of elements dropped from the front of the vector is adjusted by the number of non-stored elements at the front of the vector. The next two values in the return vector, both zero, are not used.

For example, vector ←1 2 3→ has an upper bandwidth $\mu\beta$=2 and a lower bandwidth $1\beta$=1. If $\hat{1}$=<2>, one element is dropped. The one non-stored element (the –) and the one element (the 1) yields 2–1=1 element dropped so that the 2, the second element with a 0 origin, may be accessed (one element taken).

Decision block 66 determines if the array is dense by checking whether the number of non-stored elements across the 0th row is zero and the number of non-stored elements down the 0th column is zero. If there are no non-stored elements across the 0th row or down the 0th column, decision block 66 results in a "yes" indicating a dense array and decision block 70 is called. If there are non-stored elements in the 0th row or column, then the array is sparse. In that case, decision block 66 results in a "no" and processing continues to decision block 67.

Decision block 70 determines whether the dimensionality of the array equals two. More specifically, if the number of elements in the shape vector is equal to two, then the array is two-dimensional. If the array is two-dimensional, a "yes" in decision block 70 calls function block 73. Conversely, a "no" in decision block 70 calls function block 74.

Function block 73 returns three zeros. This is because Bpsi returns a vector when indexing a two dimensional array, and a dense two dimensional array (a "yes" in decision block 70) needs no non-stored element count adjustment since there are no non-stored elements. Similarly, the upper bandwidth and the lower bandwidth both are returned as zero, as shown by the last two elements of the return vector in function block 73.

A multi-dimensional dense array (a "no" in decision block 70) results in a sub-array returned to the main Bpsi loop. If the array is dense, the sub-array is also dense. There are no non-stored elements, so the number of non-stored elements returned is 0 (as shown by the 0th element in the returned vector in function block 74). Function block 74 returns a non-stored count of zero, and does not alter the upper or lower bandwidths, elements 1 and 2 of the return vector. The upper bandwidth and the lower bandwidth are unchanged since the structure of two dimensional arrays comprising the multi-dimensional arrays is the same.

If decision block 67 is reached, the array is sparse. Decision block 67 tests the dimensionality of the array to determine if it is a multi-dimensional array, i.e. the dimensionality is greater than 2. If the array is multi-dimensional, then decision block 67 results in a "yes" and calls function block 75. Otherwise, processing continues to decision block 68.

Function block 75 returns the total number of non-stored elements as the 0th element of the return vector and does not change the upper or lower bandwidths, the first and second elements of the return vector.

A multi-dimensional array (a "yes" in decision block 67) returns the total number of non-stored elements in the highest dimension sub-array (i.e., the 0th dimension) of the array as the 0th element of the return vector. For example, if the shape vector $\rho\xi$=<3 2 5 4>, then the number of non-stored elements in the sub-array with shape vector $\rho\xi$=<2 5 4> times the number of those sub-arrays with shape <2 5 4> that precede the indexed sub-array is returned as the 0th returned value, or the non-stored count value. The indexing is performed over the 0th dimension (i.e. ($\rho\xi$)[0] or 3). The lower and upper bandwidths are unchanged since the structure of sub-arrays must be the same.

If the array is sparse and two-dimensional then decision block 68 is reached. Decision block 68 determines that a "take" is requested on the first invocation of algorithm 5(*d*), so a "yes" results and function block 76 is called. On the second invocation of algorithm 5(*d*), decision block 68 results in a "no" since a "drop" is requested, and function block 77 is called. Function block 76 returns the non-stored count (the 0th return value) as the number of leading non-stored elements plus the number of trailing non-stored elements. Function block 76 also returns to the number of leading non-stored elements and the number of trailing non-stored elements to update the upper bandwidth and lower bandwidth respectively.

A two-dimensional array results in Bpsi returning a row. If the operation is a "take", a row is selected. The row length is adjusted by the number of non-stored leading elements plus the number of non-stored trailing elements of the row as shown by the return values in function block 76. The number of non-stored leading elements updates for the lower bandwidth $1\beta$ and the number of non-stored trailing elements updates for the upper bandwidth $\mu\beta$.

If the array is sparse and two-dimensional and the operation is a drop (a "no" in decision block 68) then the total number of non-stored elements in all rows preceding the current row is returned as the 0th return value, or the non-stored element count value. The upper bandwidth $\mu\beta$ and lower bandwidth $1\beta$ are unchanged, as shown in block 77. The set of calls to algorithm 5(*d*) SparseAdj, namely the "take" call and the "drop" call, result in three values returned. First, the number of non-stored elements to subtract from the number of elements in a dense indexed item, second, the updated upper bandwidth, and third, the updated lower bandwidth. The bandwidth values identify the structure of the requested item. The two-dimensional sparse "drop" returns the number of non-stored elements to subtract from the dense offset of the indexed item. The upper and lower bandwidth parameters are not updated since they are updated on the "take".

Upon completion of function blocks 71 through 77, control is returned to function block 58 of the main Bpsi loop. When both the take and drop calls to algorithm 5(*d*) are complete, as shown in block 58 of FIG. 5(*a*), the main Bpsi loop on ($\tau\hat{1}$) resumes. The input parameters are similarly updated for the next iteration of the main loop (see bottom of FIG. 5A).

1) $1\nabla\hat{1}$

2) $1\nabla\rho\xi$

3) $(\pi(1\nabla\rho\xi)-T[\mathbf{0}])\Delta((\hat{1}[0]\times\pi(1\nabla\rho\xi))-D[\mathbf{0}])\nabla$ rav $\xi$

4) T[1]

5) T[2]

6) s

Number 1 above states that the leftmost element of the index vector is dropped. Number 2 states that the leftmost element of the shape vector is dropped. Number 3 states that all the elements preceding the indexed piece of the array are dropped and the number of elements that make up one item in the highest dimension of the array are taken. This is implemented as an offset into the array (an address) and a count of the number of elements in the indexed result. Numbers 4 and 5 state that the take invocation of algorithm 5(*d*) updates the upper and lower bandwidth parameters. The drop invocation values for the upper and lower bandwidth parameters are not used. Number 6 says that the symmetric indicator never changes.

In summary, Bpsi calculates the number of elements in a dense or sparse array, sub-array, vector or scalar that is requested by an index vector and subtracts the number of non-stored elements to reach the offset of the desired item. The upper bandwidth and lower bandwidth are updated so that they describe the indexed result. An offset into the original array, the shape of the resulting array and the structural information (bandwidth and symmetric indicator) of the result are returned.

The operation of the flowchart shown in FIGS. 5(a)–5(d) is illustrated in FIGS. 5(e)–(g). The example in FIG. 5(e) shows an array with index, shape and structure variables.

With this example, there are three iterations of the loop in FIG. 5(a) because the number of elements in the index vector $(\tau\hat{1})$=3. On the first iteration, the initial value of the index vector $\hat{1}$=<1 2 2> and the top three on decision blocks 51–53 are "no". Decision block 54 is a "yes" since the number of elements in the index vector $\hat{1}$=3. Algorithm 5(d) is called to calculate the offset of the highest, or leftmost, dimension of the array. FIG. 5(f) shows how the 1st plane is selected with an origin of 0, and the index vector, shape vector and structural information are updated.

On the second iteration of the main loop, the index vector $\hat{1}$=<2 2> and decision block 54 is the only "yes". The flow enters the algorithm of 5(d) where the array $\xi$ is set to the second row (origin of zero) of the sub-array in FIG. 5(f), $\xi$=<22 23 24>, $\hat{1}$=<2 >, $\rho\xi$=<4>, $\mu\beta$=l$\beta$=1, and s=0.

On the third iteration, the first two decision blocks 51 and 52 produce a "no", but the third decision block 53 is satisfied since the number of items in the index vector $\tau\hat{1}$=1 and the number of items in the shape vector ($\rho\xi$=1). Because a scalar is extracted from this row to satisfy the index vector, a check is performed by the algorithm in FIG. 5(c) to ensure a stored element is requested. In decision block 62 of FIG. 5(c), the index vector $\hat{1}$=<2> is greater than the lower bandwidth (l$\beta$=1). Therefore, the main loop transfers control to decision block 54 where algorithm 5(d) is called to calculate the offset of the requested scalar and update the structural parameters.

At the top of the loop of FIG. 5(a), decision block 51 yields a "yes" because $\tau\hat{1}$=< > and the returned values are $\xi$=23, $\rho\xi$=< >, $\mu\beta$=l$\beta$=0, and s=0 as shown in FIG. 5(g).

Figure 8:
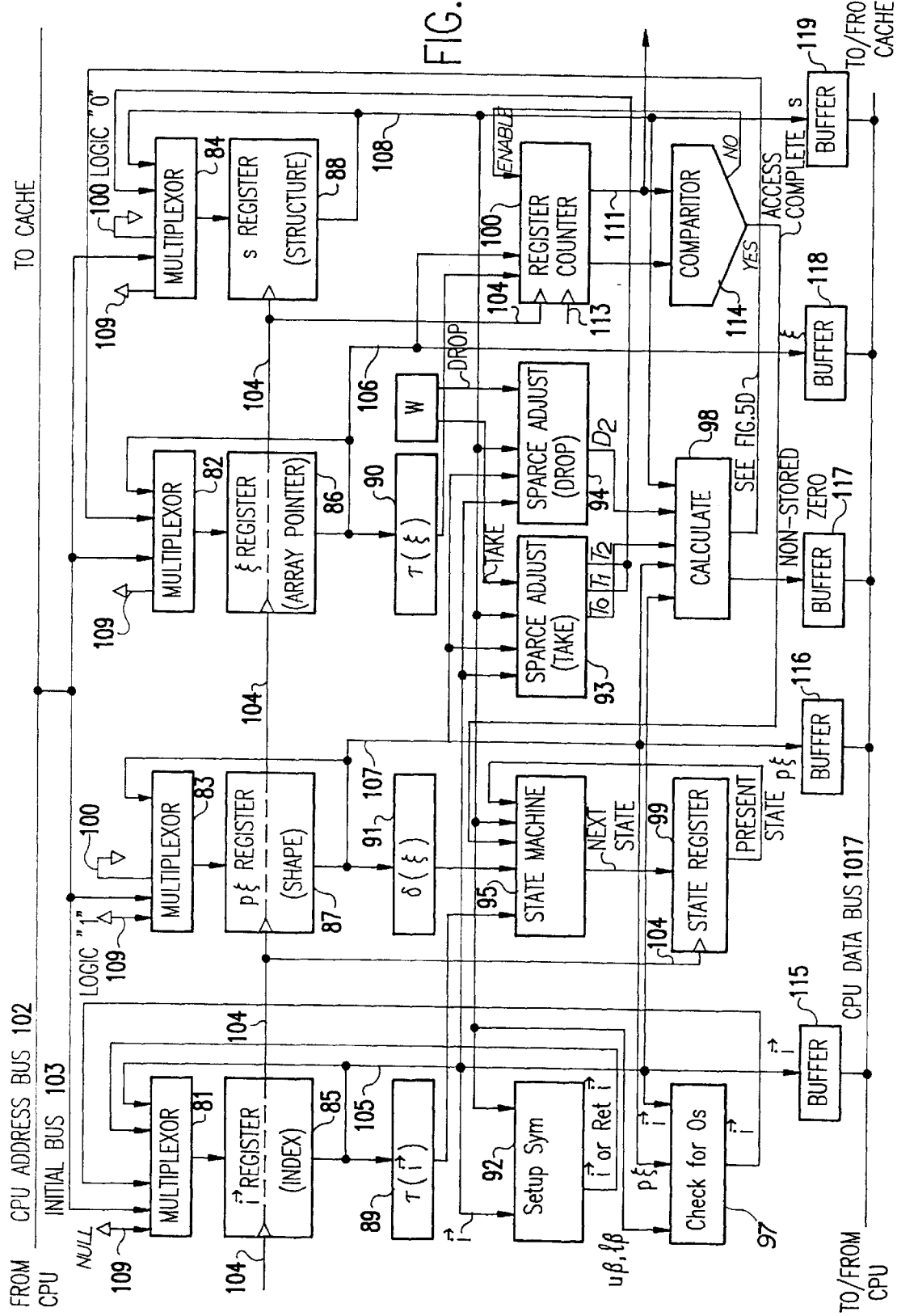
FIG. 8 is a block diagram representing the Banded Psi address co-processor according to the present invention.

FIG. 8 illustrates a preferred embodiment of the invention, namely an address co-processor for accelerated patterned sparse array accesses of data cache and main memory. FIG. 15 shows a preferred embodiment of the address coprocessor as used with the CPU, data cache and memory. The invention intercepts a CPU address request and efficiently generates the addresses to fulfill the request. Specifically, FIG. 8 shows a Bpsi apparatus block diagram. It shows how the CPU address bus 102 and CPU data bus 101 are attached to the Bpsi apparatus. The Bpsi apparatus is electrically connected to the CPU data bus 101 by buffer circuits 115, 116, 117, 118 and 119. These buffers isolate the Bpsi apparatus from the CPU data bus 107 to prevent interference when the associated signals are not requested by the CPU. Buffers 116, 118 and 119 return the Bpsi results $\rho\xi$, $\xi$, $\mu\beta$, l$\beta$, (see FIG. 5(a), function block 55). These buffers are enabled by the Bpsi state machine 95 upon satisfaction of the decision block shown in FIG. 5(a) 51. Buffer 115 returns $\hat{1}$ upon control from the CPU. Buffer 117 returns a non-stored zero. The Bpsi address bus 111 is attached to the data cache. The Bpsi apparatus is utilized during Read and Write operations and frees the CPU from having to output the address on the CPU address bus, thus allowing the CPU to operate faster and more efficiently. (Note that only data-flow and clock signals are drawn, control $\hat{1}$ signals are not drawn.)

The apparatus is organized around four registers containing the index vector $\hat{1}$ register 85, the array ($\xi$) address register 86, the shape ($\rho\xi$) register 87 and the structure (s) register 88. The formats of these registers are shown in FIGS. 14(a)–(c). As discussed in more detail below, FIG. 14(a) shows the format for the index and shape register. FIG. 14(b) shows the format for the array address register. FIG. 14(c) shows the format for the structure register.

Figure 9:
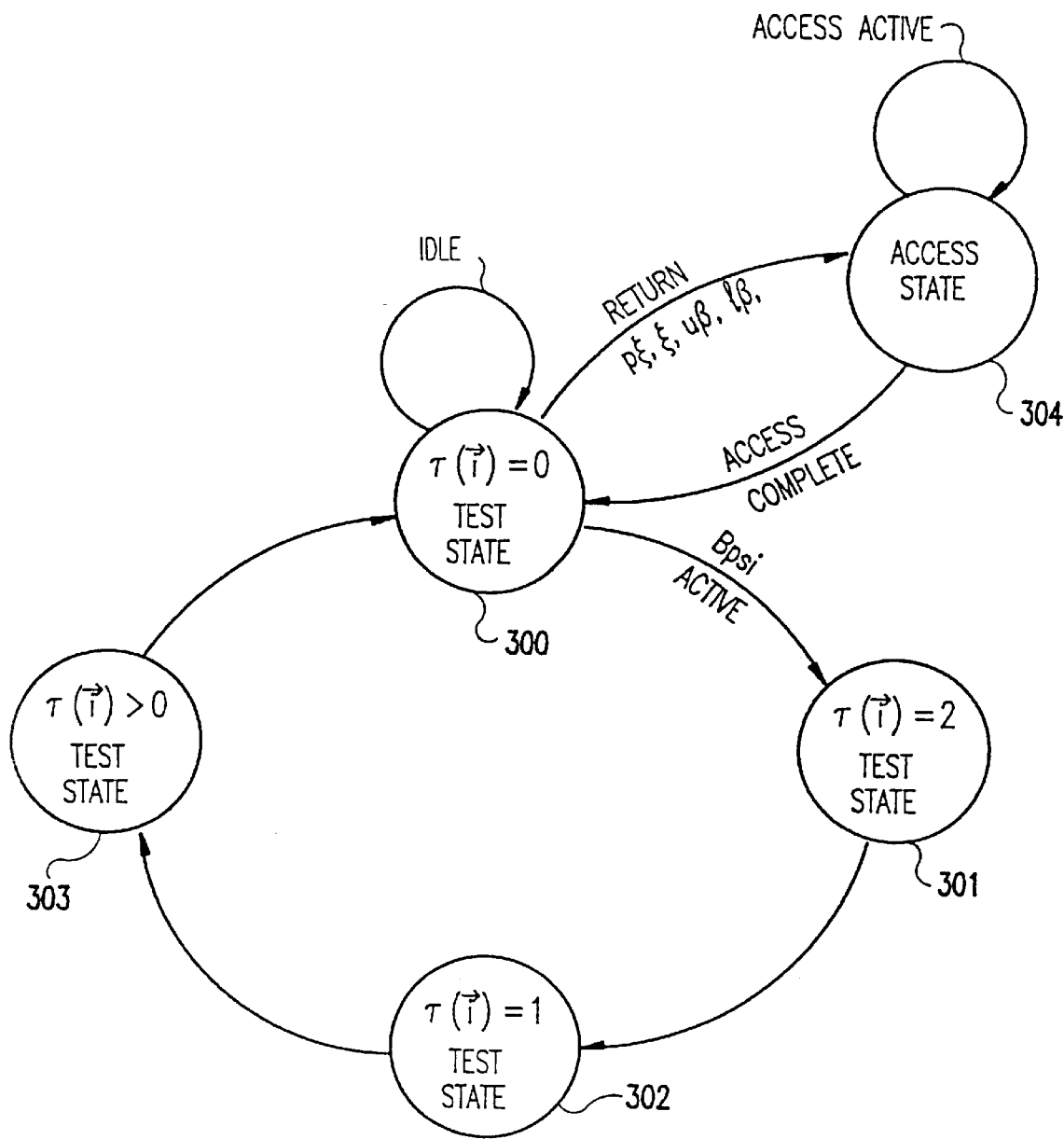
FIG. 9 is a state diagram for the hardware of FIG. 8.
Figure 10:
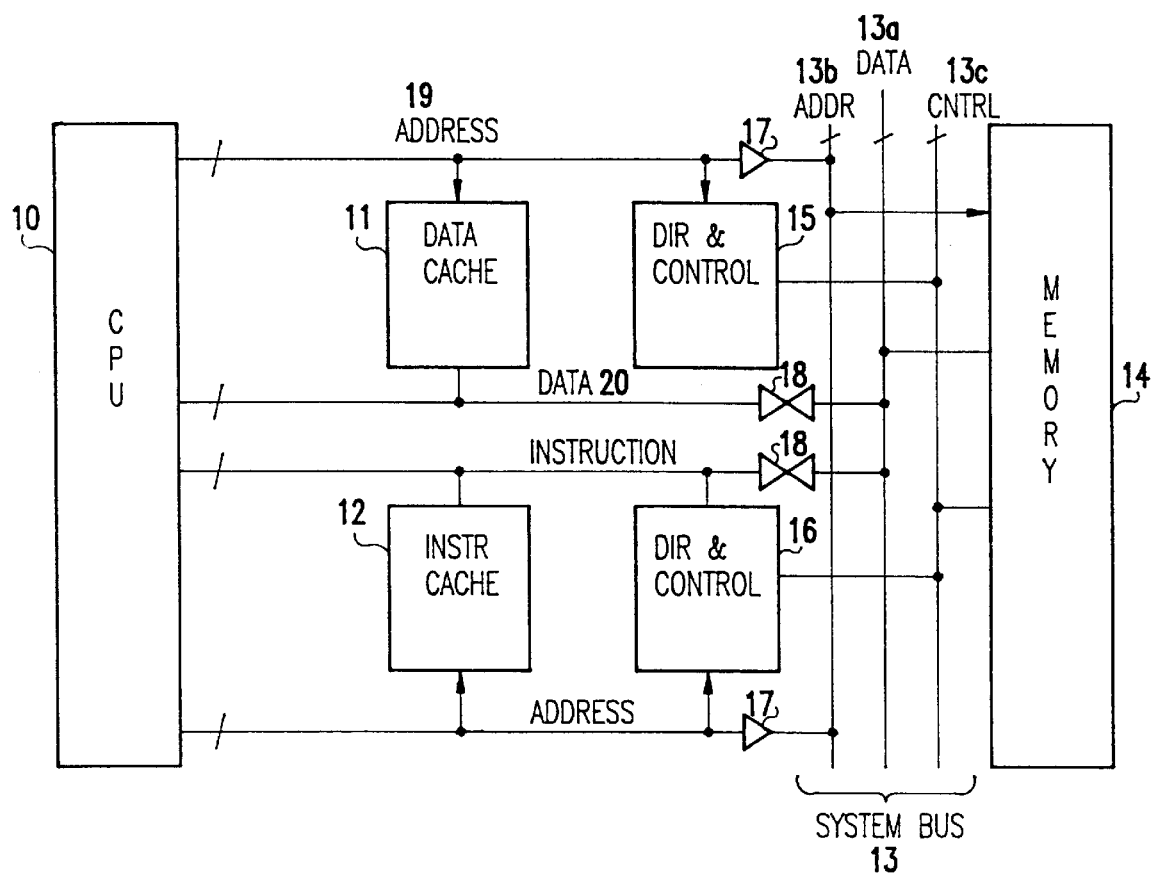
FIG. 10 is a block diagram representing hardware including a data cache and an instruction cache according to the prior art.
Figure 11A:
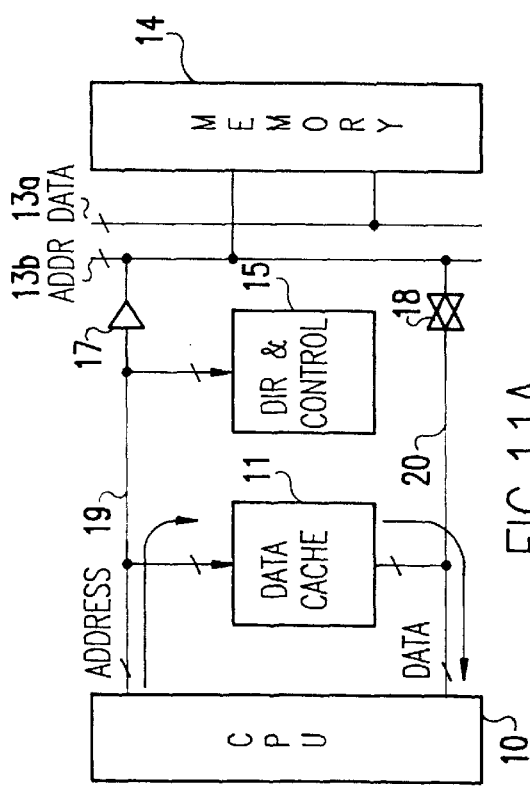
FIGS. 11 (a)–(d) are block diagrams of FIG. 10 illustrating a read hit, a read miss, a write hit and a write miss.
Figure 11B:
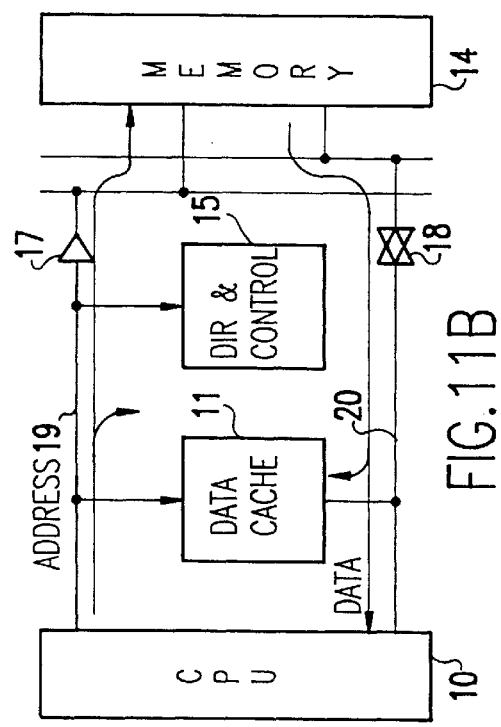
Figure 11C:
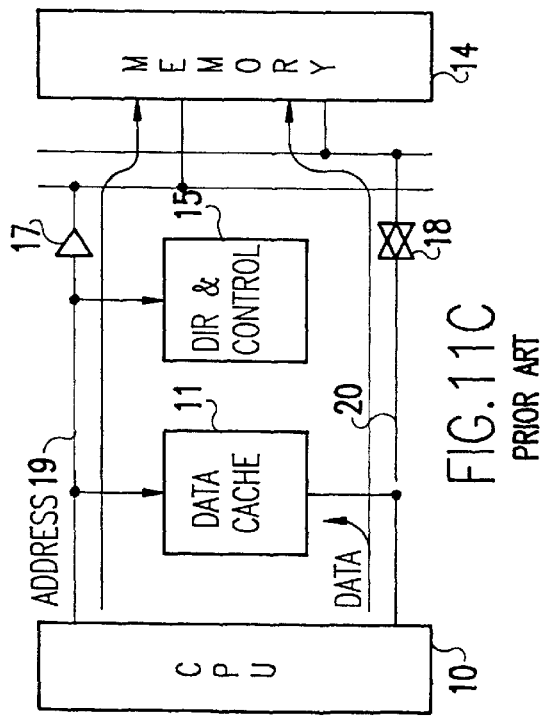
Figure 11D:
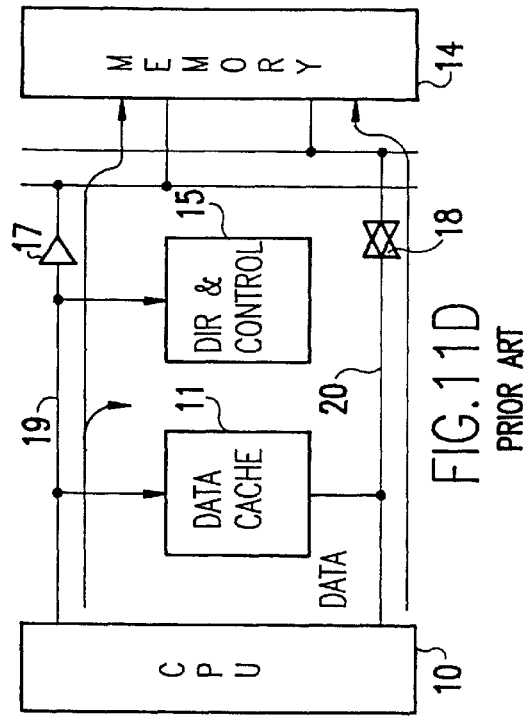
Figure 12:
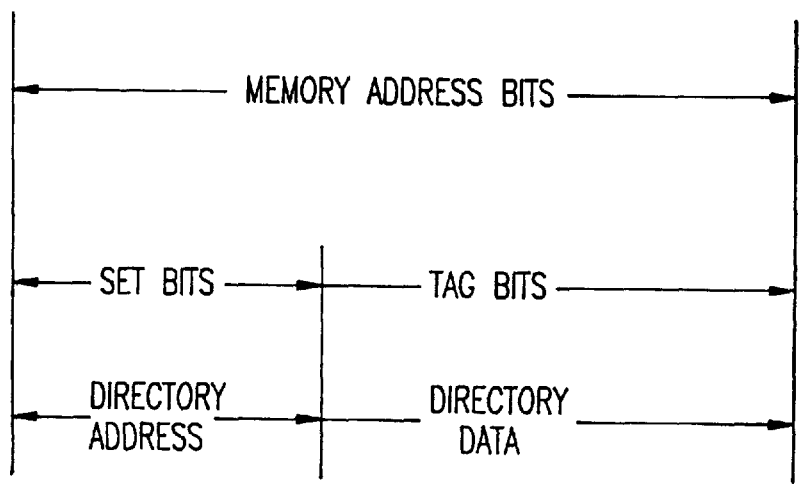
FIG. 12 illustrates the format of a typical address request issued by a central processing unit.

These four registers (85–88) and the Bpsi State register 99 use a common clock (CLK) signal 104. The Bpsi address register/counter 100 uses two clocks: the common clock 104 to load its register, and the system clock to increment its counter. The connection of the clock to the registers and counter is symbolized by the "Wedge" (see, for example, the index register 85). The frequency of clock signal 104 is four times that of the clock signal of the CPU, allowing the Bpsi apparatus to loop through its four states during one CPU clock cycle. These states are illustrated in FIG. 9. The states represent each dimension of the array that the index vector accesses. The hardware maximum number of array dimensions is four for this embodiment.

FIG. 9 shows the Bpsi state diagram and its four states. The states, labeled $\tau\hat{1}$=0 test, $\tau\hat{1}$=2 test, $\tau\hat{1}$=1 test and $\tau\hat{1}$>0 test, correspond to each decision block of the main Bpsi loop in the flowchart of FIG. 5(a). When no CPU access command (register load or register store) is active, the state machine idles in the $\tau\hat{1}$=0 test state. When a CPU memory access command is issued, the state machine loops through its states in the same manner as the flowchart shown in FIG. 9 until the index register is empty. At this point, the Bpsi address counter 100 is loaded and incremented, so the subarray is accessed as shown in FIGS. 15(a)–(d), as discussed in detail below.

Referring to FIG. 9, the initial address bus 103 is connected to the CPU address bus 102 from which the index vector register 85, the array address register 86, the shape register 87 and the structure register 88 are set by the CPU. This action occurs when the CPU issues an address coprocessor memory access (read or write) command.

The multiplexor (mux) circuits 81–84 shown in FIG. 8 select a specific input to route to their corresponding register based on a selection (sel) control signal. These selection control signals are provided by the state 95 machine and are not shown in FIG. 8 for sake of clarity.

The index vector register 85 inputs the index vector from the index multiplexor 81 and outputs the current index vector on the index bus 105 which allows the index counting $\tau\hat{1}$ operation unit 89 access to the current index vector. The index vector counting unit 89 includes a logic array combination of AND and OR circuits. The index counting $\tau\hat{1}$ operation unit 89 performs the function of detecting the number of elements in the current index vector (see FIG. 5A, decision blocks 51, 52, 53 and 54), including the empty or null code, which is, all bits set to a logic "1". For example, if the index vector $\hat{1}$=<1 2 2>, then the number of elements $\tau\hat{1}$=3. This is accomplished by detecting the number of non-null fields in the current index vector and generating the $\tau\hat{1}$=0, 1, 2 and >0 test signals and outputting it to the state machine 95.

The array address register 86 inputs the array address multiplexor 82 and outputs the array address on the array bus 106 which allows the array counting $\tau(\xi)$ operation unit 90 access to the array address. The array counting $\tau(\xi)$ operation unit 90 counts the number of elements in the array. The number of elements in the array is used by the register counter 100, in synchronization with the system clock signal 113, to update the array address that is accessed and output on the Bpsi address bus 111.

The shape register 87 inputs the shape vector of the array from the shape multiplexor 83 and outputs the as shape vector on the shape bus 107. The dimensioning function unit δξ 91 reads the shape information from the shape bus 107 and outputs the dimensions of the array to the state machine 95 (see FIG. 5A, decision blocks 52 and 53). For example, if the dimensioning function unit 91 determines that the shape of the array, ρξ is <4 5>, then two is output to the state machine 95 by the dimensioning function unit δξ 91. Function unit 91 is implemented by an AND/OR logic array.

The structure register 88 inputs the structure information from structure multiplexor 84 and outputs the elements of the array structure, such as upper and lower bandwidth and symmetry, on the structure bus 108. This structure information is used by the state machine 95, SetupSym 92 and the CheckFor0s operation unit.

The SetupSym operation unit 92 receives the current index vector from the index bus 105 and the upper bandwidth from the structure bus 108. The SetupSym unit 92 performs the action of rotating the index vector, if necessary when addressing a symmetric array, as described in FIG. 5($a$), in function block 56. The value of the index ($\hat{1}$) or the rotated value of the index is sent to index multiplexor 81.

The CheckFor0s operation unit 97 receives the current index vector from the index bus 105, the shape of the array from the shape bus 107, and the current upper and lower bandwidths from the structure bus 108. The CheckFor0s unit 97 checks if a non-stored element is accessed, as described above with respect to FIG. 5($a$), and shown in FIG. 5A, function block 57. CheckFor0's unit 97 operates on the index register as shown in FIG. 5B.

Multiplexor 81 receives inputs from the initial address bus 103, the CheckFor0's operational unit 97, the SetupSym operational unit 92, and the index bus 105. The index bus 105 input is used to circulate the present state of the index register 85 when its contents are not changed. Multiplexor 81 chooses from the foregoing inputs based on the select signal from the state machine 95. Multiplexor 81 receives a system voltage 109 for a logic "1" to indicate a "null" index value.

Multiplexor 82 receives inputs from the initial address bus 103, the calculation unit 98, the array bus 106 and system voltage 120 which provides a logic "1" to indicate a "null" array address. This occurs when a non-stored zero element is requested. Multiplexor 82 chooses from the foregoing inputs based on the signal from the state machine 95. Multiplexor 82 outputs the selected input to array register 86.

Multiplexor 83 receives inputs from the initial address bus 103, the shape bus 107, system voltage 109 that provides a logic "1" and system ground 100 that provides a logic "0". A logic "1" is used to set a null value for input into the shape register 87. This occurs when a non-stored zero element is requested because the shape of a scalar, or a non-stored zero, is empty. A logic "0" is used to set a zero value to the shape array when the array register contains an empty array (i.e. an address of $F_{hex}$'s) because the shape of an empty array is zero. Multiplexor 83 chooses from the foregoing inputs based on the signal from the state machine 95. Multiplexor 83 outputs the selected input to shape register 87.

Multiplexor 84 receives inputs from the initial address bus 103, the SparseAdj operation unit 93, the structure bus 108, system voltage 109 and system ground 110. The logic "0" from system ground is used to set $\mu\beta$ and lB to 0 when returning a scalar result. The logic "1" is used to set the symmetric indicator for a symmetric array. Multiplexor 84 chooses from the foregoing inputs based on the signal from the state machine 95. Multiplexor 84 outputs the selected input to structure register 88.

When no access is active and the state machine is in $\tau\hat{1}$=0 test state, the multiplexors (81–84) select the initial address bus 103. Thus, when an access command is issued by the CPU, the Bpsi registers 85–88 are loaded with their respective values. The multiplexors 81–84 also provide for the reload of the registers 85–88 with their current value when these values remain unchanged.

The state machine 95 receives inputs from the index vector counting operation unit $\tau\hat{1}$ 89 regarding the number of elements remaining in the index vector, and outputs this information to the state machine 95. The state register 99 receives an input from the Bpsi clock 104 and the output of the state machine 95. The state register 99 maintains the state of the Bpsi apparatus, which is illustrated in FIG. 9 and returns its output to the state machine 95.

Upon detection of a CPU load signal, the state machine 95 (in state $\tau\hat{1}$=0 test) (see FIG. 9, circle 300) determines whether the next state is the "access" state that occurs when the index register is null (as denoted by "all $F_{hex}$"). When the index vector is null, the address calculation is complete (see FIG. 5A, function block 55). The determination of an access state is made based on output of the ($\tau\hat{1}$) index vector counting unit 89 (see FIG. 5A, decision block 51).

The index vector counting unit 89 provides signals used by the state machine 95 to determine the current state (i.e., ($\tau\hat{1}$)=0 test, ($\tau\hat{1}$)=2 test and ($\tau\hat{1}$)>0 test, and access) (see FIG. 9). If the CPU issues a load or store command with an initially null index vector, then the CPU accesses the entire array. In such a case, the state machine 95 advances immediately to the "access" state without repeatedly going through the "loop".

The state machine 95 remains in the access state until all of the array is read from the cache (in the case of a hit) or memory (in the case of a miss). The behavior of the Bpsi apparatus during an access is shown in FIG. 15.

The operation of state machine 95, as illustrated in FIG. 9, is shown in the following example. If the initial index vector is not null, then the state machine 95 advances to the ($\tau\hat{1}$)=2 test state (see FIG. 9, circle 301). The conditions specified by FIG. 5($a$) decision block 52 are logically tested to determine whether the array is symmetric and two dimensional by the state machine 95. This test by the state machine 95 is accomplished by using signals from the $\tau\hat{1}$ unit 89, the δξ unit 91, and the s register 88. The state machine 95 directs the select lines of the index register multiplexor 81 to choose the SetupSym function 92 as the input to the index vector register 85, so the index vector $\hat{1}$ may be rotated if the logical conditions in SetupSym are satisfied at the next state Bpsi clock (CLK) signal 104.

Next, in this example, the state machine 95 advances to the ($\tau\hat{1}$)=1 test state (see FIG. 9, circle 302) and checks whether the array is one-dimensional and whether the index vector is accessing a non-stored element as discussed above with respect to FIG. 5($a$) decision block 53. If this condition is satisfied at state ($\tau\hat{1}$)=1 test state, the index vector register 85 is loaded by the state machine 95 selecting the CheckFor0's operation unit 97. If a non-stored element is requested, then the array register 86, the shape register 87, and the structure register 88 are loaded by the state machine selecting the system ground 100 or system voltage 109, signals.

Next, the state machine advances to the $(\hat{\tau}\mathbf{1})>0$ test state (see FIG. 9, circle 303). If the conditions specified in FIG. 5A, decision block 54 is satisfied, then the SparseAdj Take unit 93 and SparseAdj Drop unit 94 calculate how the index register 85, the array register 86, the shape register 87, and the structure register 88 are updated.

The SparseAdj Take unit 93 and SparseAdj Drop unit 94 each receive inputs from the index bus 105, the array bus 106, the shape bus 107, the structure bus 108 and the W unit 112. The take unit 112 provides a control signal to the SparseAdj Take 93 and Drop 94 units. The inverted form of the take unit signal is the drop signal and is used by functional unit 94. This operation is described by FIG. 5A, function block 58.

The SparseAdj Take unit 93 outputs $T_0$, $T_1$, and $T_2$. The $T_0$ output is the number of non-stored zeros to adjust the array address by. $T_1$ is the adjusted value of the upper bandwidth $\mu\beta$. $T_2$ is the adjusted value of the lower bandwidth $l\beta$. The SparseAdj Take unit 94 outputs $T_0$ to the calculation unit 98. See FIG. 5A, decision block 58, and FIG. 5D).

Figure 16:
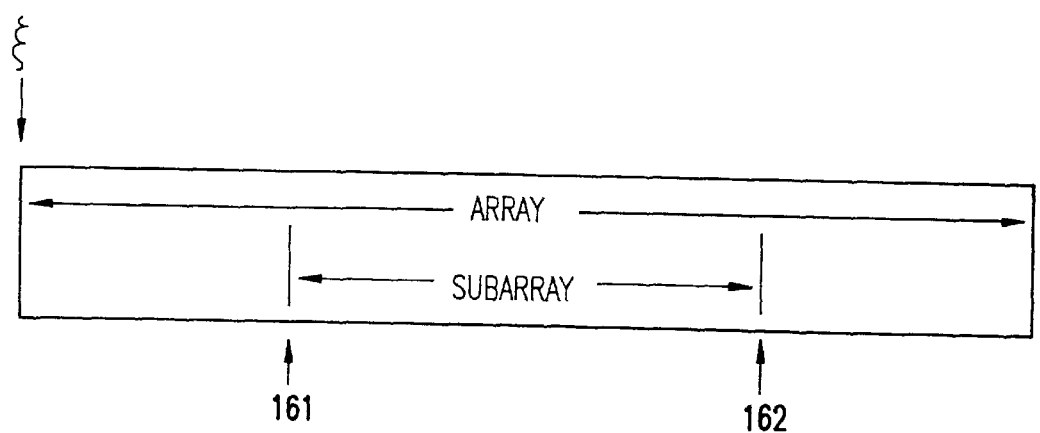
FIG. 16 illustrates a subarray within an array to illustrate the access state of the hardware of FIG. 8.

The calculation unit 98 receives inputs from the $(\hat{\tau}\mathbf{1})$ index vector count unit 89, the index bus 105, the shape bus 107, the SparseAdj Take 93 and from the SparseAdj Drop 94 (see FIG. 5A, decision block 58 and FIG. 5D). The calculate unit performs the function of calculating the updated "start" value of the array when accessing a subarray. For example, FIG. 16 shows an updated start value 161 which is equal to the array plus the offset and minus the count of non-stored zero elements. Similarly, FIG. 16 illustrates an updated end value 162 which is equal to the updated start value 161 plus the number of stored elements in the subarray. The address of the adjusted array (i.e., the sub-array) is returned to the array address multiplexor 82.

Further, if a non-stored zero is accessed, the calculation unit 98 outputs a zero into the CPU data bus 101 buffer 117. Therefore, from its inputs, the calculation unit 98 is able to allow the entire array to be accessed by outputting zero values to the buffer when accessing zeros outside the band defined by the upper and lower bandwidths.

Counter 100 receives input from the array address bus 106, the array counting unit 90, the system clock 113, and the Bpsi clock 104. The counter 100 contains an incrementor that is loaded with the starting address of the array 106. This occurs as shown in FIG. 9, access state 304. The counter 100 also contains a register that is loaded with the starting array address 106 added to the array count 90. The counter 100 outputs a sequentially incremented address each cycle of the system clock 113 on the Bpsi address bus 111 to allow data in sequential address locations in memory to appear on the CPU data bus 101.

When the counter 100 incrementor equals the counter 100 register, all data requested by the index vector has been accessed. Comparator 114 receives input from the counter 100 incrementor and register. When these values do not match, comparator 114 outputs a "no" signal and the counter continues counting. When the values match, the comparator 114 outputs a signal to the state machine 95 which indicates that the count has reached zero and that all data has been accessed. State machine 95 then resets the multiplexors 81–84 to access the initial address bus 103 so that a new access can be processed and sets the state to the $(\hat{\tau}\mathbf{1})=0$ test state.

Registers 85, 86, 87 and 88 of FIG. 8, are 64 bits wide in this embodiment. The width of these registers is a practical limitation on the maximum number of elements in a given dimension, and so the maximum number of dimensions supported by this implementation.

FIG. 14(*a*) shows the index and shape register format. This format supports four dimensions: hyperplane 0, plane 1, row 2 and column 3. Each of these dimensions is divided into half-byte, or nibble, fields, each of which holds a HEX value. Within each dimension, the code of "all $Fs_{HEX}$" is reserved to represent a null value for that dimension. The format supports $2^{12}-1$ hyper-planes, $2^{12}-1$ planes, $2^{20}-1$ rows and $2^{20}-1$ columns, since, for example the hyper-plane field has three nibbles (12 bits).

FIG. 14(*b*) shows a 64-bit address register. FIG. 14(*c*) shows the structure register format. The symmetry (s) bit is a right justified 1-bit field. The upper bandwidth ($\mu\beta$) and lower bandwidth ($l\beta$) fields support ($2^{20}-1$) width.

The definition of the commands used to control this implementation follow.

A CPU address coprocessor register load operation for an array is $$R \leftarrow [\text{MEM} (R_0, R_1, R_2, R_3)] \qquad \{EQ\ 5\}$$

where the left-hand-side is the CPU data register to load with the first element of the accessed array and $R_0$, $R_1$, $R_2$, $R_3$, respectively are the CPU index, the array address, shape and structure registers. Equation 5 is analogous to equation 1. An address coprocessor register store operation is expressed as $$[\text{MEM} (R_0, R_1, R_2, R_3)] \leftarrow R \qquad (EQ\ 6\}$$

where the right-hand side is a CPU data register to store in the first element of the accessed array. It is stored in memory at the Bpsi address specified by CPU register $R_1$. Registers $R_0$, $R_2$, $R_3$ are loaded with information that describes the indexed array. Equation 6 is analogous to equation 3.1.

The apparatus shown in FIGS. 15(*a*)–(*d*) continues to describe the preferred embodiment of this invention. This apparatus implements the storage and retrieval of such arrays from the data cache and memory, including the information relating to non-stored elements of such arrays. FIGS. 15(*a*)–(*d*) can be compared to FIG. 11(*a*)–(*d*), in which no Bpsi address coprocessor is available.

FIGS. 15(*a*)–(*d*) show the four operations of the Bpsi coprocessor 60 which includes the apparatus described in FIG. 8. The Bpsi generated address is associated with the data cache 211 or memory 214, as was discussed with respect to FIGS. 11(*a*)–(*d*) so Bpsi performs the functions of an address coprocessor for the CPU. Therefore, the invention frees the CPU from address functions and increases the efficiency of the CPU by allowing the CPU to perform other actions while the Bpsi apparatus calculates addresses. The increase in performance provided by the Bpsi coprocessor 60 is seen by comparing FIGS. 11(*a*)–(*d*) with 15(*a*)–(*d*), as explained below.

FIG. 15(*a*) shows a read hit operation. During a read hit, the CPU 210 executes a load register command of equation 5.

The left-hand side of the equation is the CPU register to be loaded with the first element of the indexed subarray, and $R_0$ through $R_3$ are CPU registers formatted according to FIG. 14. The contents of these registers appear in parallel on the CPU address bus 219. All four registers are "clocked" into the corresponding registers in the Bpsi apparatus 60. As shown in FIG. 9, the Bpsi apparatus would, upon detection of an active access command from the CPU "loop" until a null index is formed, at which time the address of the accessed sub-array is output by the Bpsi apparatus 60 to the data cache during the "access" state. The directory and control unit 215, in FIG. 15(*a*), detects a match of this address, indicating that the subarray is in the data cache.

This initiates the extraction of the addressed subarray from the data cache, the first element of which is loaded into the left-hand-side CPU register shown in equation 5.

Figure 15A:
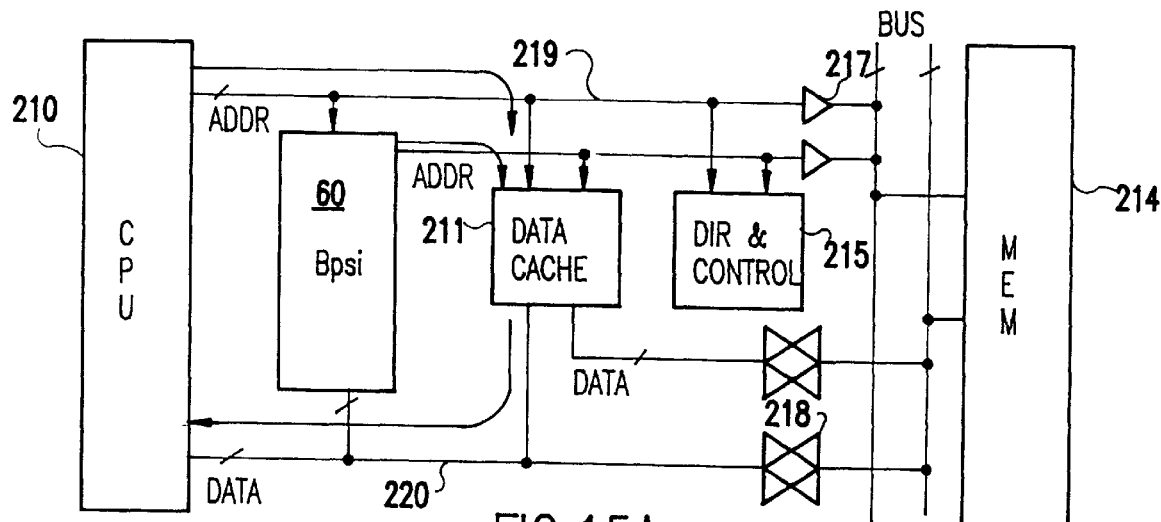
FIGS. 15(a)–(d) are block diagrams illustrating four operations of the Banded Psi co-processor according to the present invention showing a read hit, a read miss, a write hit and a write miss.
Figure 15B:
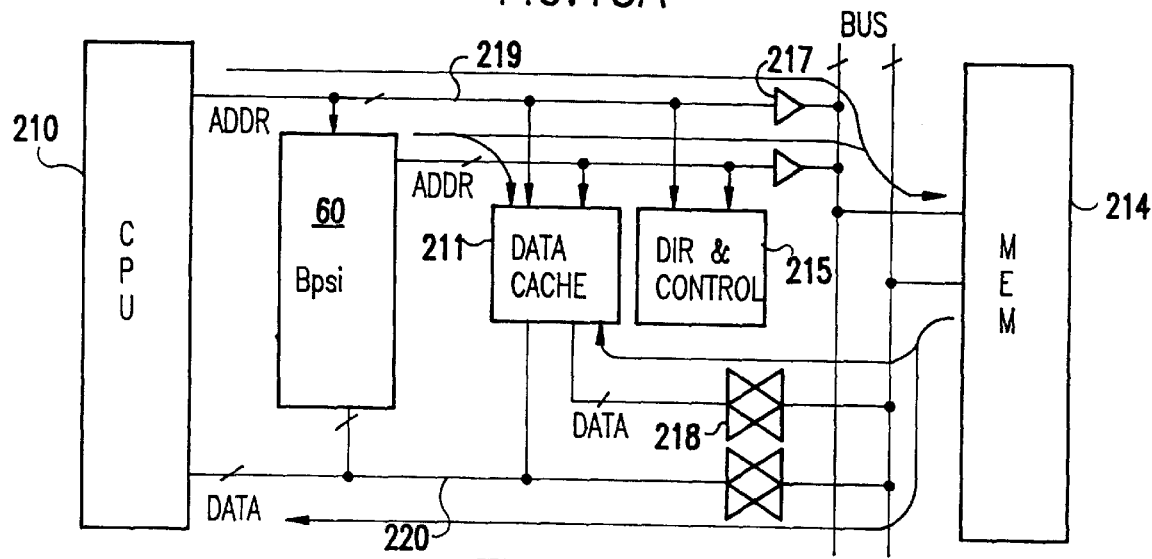

FIG. 15(b) shows a read miss operation. That is, the CPU 210 is executing equation 5, and the directory and control unit 215 of FIG. 15(b) fails to indicate a matching value for the subarray address. This means that the addressed subarray must be fetched from system memory 214, the first element of which is loaded into the left-hand-side CPU register. The addresses for this subarray are generated by the Bpsi apparatus 60. Using the "dual port" data cache 211 shown in FIG. 15(b), subsequent elements of the subarray are loaded into data cache 211 and CPU register file.

In write operations, the CPU 210 writes the array to the data cache 211 and the system memory 214 in the compressed format described above. Specifically, the CPU 210 does not write values outside the band. The CPU 210 detects values outside the band, using the shape and upper and lower bandwidths and does not assign an address corresponding to these non-stored values, nor does it output these non-stored values to the CPU data bus 220. Therefore, data is written to the data cache 211 and the system memory 214 in the format shown in FIG. 1 along with the structural information shown in FIG. 3, as described in detail above.

Similarly, the CPU 210 only stores the upper half of a symmetric array in system memory 214 and data cache 211. As described above, only one half of symmetric arrays is stored since the index vector can be rotated to reproduce the non-stored half of a symmetric array.

Figure 15C:
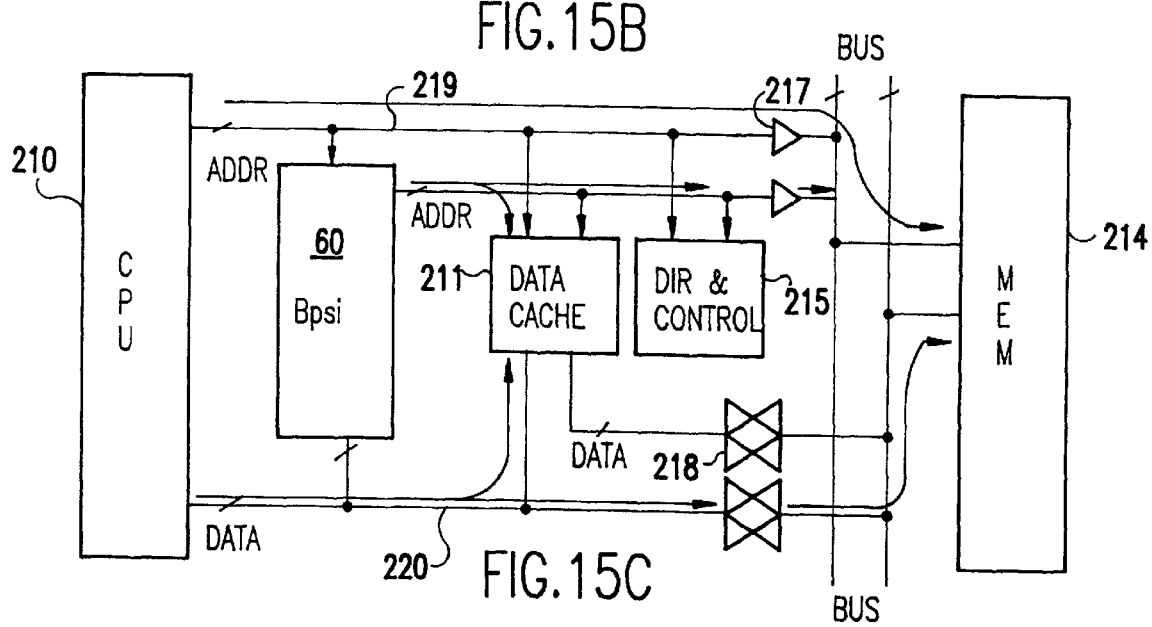

FIG. 15(c) shows a write hit operation. That is, the CPU executes a store command of equation 6.

The right-hand side is a CPU data register that is stored into the first element of the indexed subarray $R_1$ and $R_0$, $R_2$ and $R_3$ are CPU registers formatted according to FIG. 14. The directory and control unit 215 of FIG. 15(c) detects a match of this address, indicating that the subarray is in the data cache. The addresses for this subarray are generated by the Bpsi apparatus 60. Therefore, the subarray (one or more elements) is stored into both the data cache and system memory.

Figure 15D:
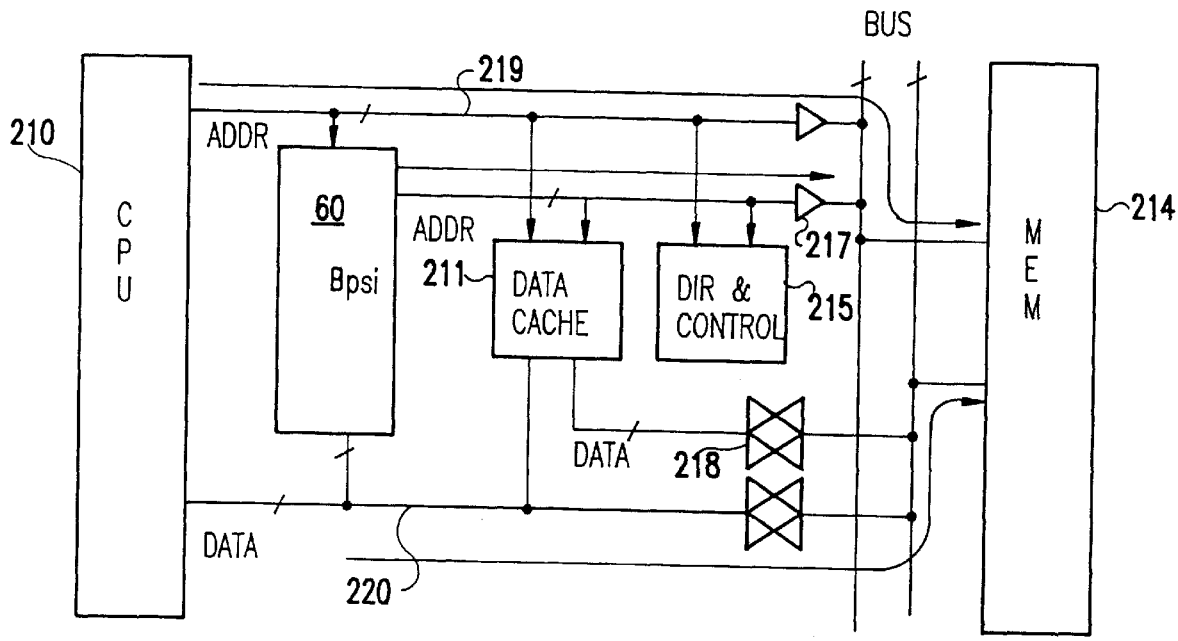

FIG. 15(d) shows a write miss operation, where the CPU has executed equation 6 and the directory and control unit 215 of FIG. 15(d) fails to indicate a matching address in the data cache 211. When this occurs, the elements of the indexed subarray are stored in system memory 214 only.

Below, the invention is shown as applied in the APL programming language. The invention is not limited to this language and may also be implemented in a microprocessor data cache address co-processor hardware or in higher-level programming language software.

A "Mathematics of Arrays" (MOA) notation is used to express the patterned sparse array representation and algorithm. MOA is a formal method of expressing any operation on an array in terms of shape and index. The rules governing the array operations allow reductions and equivalence proofs. MOA is a formal method for performing algebra on arrays and is briefly illustrated below.

MOA notation

| | |
|---|---|
| ξ | n-dimensional array |
| ρξ | returns the shape vector for array ξ (i.e. ρξ = <4 5>) |
| τξ | returns the number of elements of array ξ (i.e. (τ <0 1 2>) = 3) |
| δξ | returns the dimension of array ξ (i.e. (δ <0 1 2>) = 1) |
| σ↑ξ | take σ items over the 0th dimension of ξ starting at the first item |
| σ↓ξ | drop σ items over the 0th dimension of ξ starting at the last item |
| ψ | index function (i.e. <1>ψξ = ξ[1]) |
| ravξ | returns the row major lexicographical ordering of array ξ |
| θ | empty array |
| φî | rotated vector î (i.e. î = <4 5 6> φî = <6 5 4>) |

The main Bpsi function is represented by the following notation.

ψ →λî.λρξ.λξ.λuβ.λ1β.λs.
 if[(τî) ≡ 0,ρξ ξ uβ 1β s,
  if[((τî) ≡ 2) & (δξ ≡ 2) & (s ≡ 1), î = SetupSym (î, uβ),
   if[((τî) ≡ 1) & (δξ ≡ 1), î = CheckFor0s (î, ρξ, uβ, 1β),]]
  if[(τî)>0, R = SparseAdjust (î, ρξ, uβ, 1β, take)
   uβ = R[1]
   1β = R[2]
   ψ((1↓î),(1↓ρξ), (π(1↓ρξ) − R[0])↑((î[0] × π(1↓ρξ)) −
    SparseAdjust(î, ρξ, uβ, 1β, drop) [0])↓ravξ, uβ, 1β, s),
   ψ(î,θ,0,0,0,s)]]

To rotate the index vector when the array is symmetric the following notation is used.

Setupsym →λî.μβ.if[(_red(î)>0)&(_red(î)≤μβ),φî,î]

To check if accessing a non-stored 0 the following notation is used.

CheckFor0s →λî.λρξ.λμβ.λ1β.if[(î[0]<1 β|(î[0]≥ρξ[0]−μβ),θ,î]

To calculate how much to adjust the take or drop amount based on the shape and bandwidth parameters the following notation is used.

SparseAdjust →λî.λρξ.λuβ.λ1β.λw.
 if[δξ≡1, if[w≡take, 0 0 0, 1β 0 0],
  uβ'=(−1↑ρξ)[0] − uβ − 1
  1β'=(−2↑ρξ)[0] − 1β − 1
  if[(uβ≡0) & (1β'≡0), if[δξ≡2, 0 0 0, 0 uβ 1β],
   if[δξ>2, Total0s((1↓ρξ), uβ, 1β, î, w) uβ1β,
    if[w≡take, uβ=Leading0s(î, ρξ, 1β')
     1β=Trailing0s(î, uβ')
     uβ+1β uβ 1β,
    Upper0s(î,uβ') +Lower0s(î,1β) uβ 1β]]]]

To calculate the number of non-stored 0s in the upper right hand corner of the array the following notation is used.

Upper0s →λî.λμβ'. (μβ'×(μβ'+1)−(Max0(μβ'−î[0])×(Max0(μβ'− î[0])+1)))÷2

To calculate the number of non-stored 0s in the lower left hand corner of the array the following notation is used.

Lower0s →λî.λ1β. (Max0(î[0]−(1β+1))×(Max0(î[0]−(1β+1))+1))÷2

To calculate the total number of non-stored 0s in a two dimensional array the following notation is used.

Total0s →λρξ.λμβ.λ1β.λî.λw.if[(î[0]=0)&(w=drop), 0,
 Nonstored0s(ρξ, μβ, 1β)]

To calculate the total number of non-stored 0s in any array the following notation is used.

Nonstored0s →λρξ.λμβ.λ1β.if[τ(ρξ)=0, 0,if[τ(ρξ)=1,μβ+1β,
 π(−2↓ρξ)×(Upper0s(−2↑ρξ, ((−2↑ρξ)[1]−μβ)−1)+Lower0s
  (−2↑ρξ, 1β))]]

To calculate the total number of non-stored 0s at the end of a row the following notation is used.

Trailing0s →λî.λμβ'.if[î[0]≥μβ', 0, μβ'−î[0]]

To calculate the number of non-stored 0s at the beginning of a row the following notation is used.

$$\text{Leading0s} \rightarrow \lambda \hat{i}.[0 \quad \rho\xi.\lambda 1\beta'.\text{if}[\hat{i}[0]<((\rho\xi)[0]-1\beta'), 0, (\hat{i}[0]-((\rho\xi)[0]-1\beta'))+1]$$

To return the positive argument or 0 the following notation is used.

$$\text{Max0} \rightarrow \lambda t.\text{if}[t \leq 0, 0, t]$$

A basic premise used with the above programs is that only band array elements are stored in row major order. The shape of the array and the band pattern are used to calculate the offset of the desired element or sub-array. The Bpsi function takes as input:

1. a valid index vector, long or short, $\hat{i}$
2. an array, $\xi$
3. the shape of the array, $\rho\xi$
4. the upper half-bandwidth, $\mu\beta$
5. the lower half-bandwidth, $l\beta$
6. the symmetric indicator, s The bandwidth parameters are set as follows:
Dense arrays:

$$\mu\beta = l\beta = (-1\Delta\rho\xi)[0]-1$$

Upper triangular arrays:

$$\mu\beta = (-1\Delta\rho\xi)[0]-1 \, l\beta = 0$$

Lower triangular arrays:

$$l\beta = (-2\Delta\rho\xi)[0]-1 \, \mu\beta = 0$$

The Bpsi function returns:
1. The indexed item (or a pointer to it depending on the implementation)
2. The shape of the result
3. The upper half-bandwidth
4. The lower half-bandwidth Items 3 and 4 are adjusted as follows to correctly represent the result:

if $\tau(\rho\xi) \geq 2$ then $\mu\beta = l\beta$ = upper half-bandwidth and lower half-bandwidth respectively if $\tau(\rho\xi) = 1$ then $\mu\beta = l\beta$ = number of trailing and leading zeros respectively if $\tau(\rho\xi) = \theta$ then $\mu\beta = l\beta = 0$ The formal expression is tail-recursive. The reduction loops over each dimension specified by the index vector $\hat{i}$. The invention calculates the number of elements to skip based on subtracting out the number of non-stored elements from the dense calculations.

The invention, as described above, produces many advantages over the prior art. While some of the key advantages of the invention are outlined below, there are other advantages which are apparent from the foregoing detailed description.

Specifically, the invention frees the CPU from producing addresses, thus making the CPU more efficient. FIGS. 11(a)–(d), discussed in the Background section, show that the CPU 10 is occupied with calculating and providing addresses to the cache and or memory. However, according to the invention, and as shown in FIGS. 15(a)–(d), the Bpsi apparatus 60 performs these functions, allowing the CPU to do other work while the data is accessed, thereby increasing the efficiency of the CPU.

Another key advantage, which is in contrast to the conventional storage methods described in the Background section, is that the present invention requires much less memory because of its ability to compress the patterned sparse arrays. For example, BLAS memory requirements are represented by the following:

$$n(2l\beta + \mu\beta + 1)$$

where $l\beta$ is the lower half-bandwidth, the vertical distance from the diagonal to the edge of the band, and $\mu\beta$ is the upper half-bandwidth, the horizontal distance from the diagonal to the edge of the band and n is the order of a square matrix.

Conversely, the present invention only requires the memory represented by the following formula for a square matrix of order n:

$$n^2 - \frac{1}{2}(\mu\beta'(\mu\beta'+1) + l\beta'(l\beta'+1))$$

where:

$$l\beta' = n - l\beta - 1$$

and $$\mu\beta' = \max(n - (\mu\beta + l\beta) - 1, 0)$$

There are unused memory locations with the BLAS method. The storage savings realized by the present invention are significant and can be represented as:

$$\text{memory savings} = \text{bandwidth}/n \cdot k$$

where $67 \leq k \leq 100$ when the bandwidth is n−1 and 1, respectively.

Prefetching is the process of storing more data from the main memory in the cache memory than was requested by the CPU. The prefetched data is predictably used in the very near future during subsequent access requests from the CPU. Prefetching data speeds memory access time on the subsequent accesses because the subsequently requested data is already in the cache and does not need to be read from the slower system memory. For example, Prefetching would place several sub-arrays in the cache when only one sub-array is accessed by the CPU. The compressed nature of the array uses minimal cache memory, leaving space for other highly used pieces of data, thus employing processor resources more efficiently.

At the hardware level, performance gains are realized because the inventive method and apparatus allows prefetching which improves the cache hit ratio. Because array addressing is predictable and array operations are generally performed on all the elements of a row or sub-array, rows or sub-arrays of data may be prefetched into cache based on the structural information of the array. By retrieving more data into the cache than is initially requested, subsequent access time is reduced because the subsequently needed information is already in the cache.

Additionally, the present invention is generalized and scalable to n dimensions. There is no limit to the number of dimensions that the invention can be scaled, except for physical limitations of primary and auxiliary storage.

Regarding performance, there is a trade-off when generalized methods are compared to specialized methods. Performance gains are can be attained by distributed processing. While distribution incurs some added complexity, the potential for mechanizing the array index method and other patterned sparse array primitives, leads to an automatic partitioning and distribution of scientific and numerical problems. This type of automation makes the solution of near chip-level and chip-level microprocessor circuit and logic design simulation feasible (very large general band numerical systems) because it provides means to partition the associated arrays for subsequent parallel processing.

The invention also has applications as in semiconductor reliability computation, semiconductor testing and semiconductor design. Thus, the gains from the method of the present invention may be achieved through either a software or hardware implementation.

From a software perspective, this invention is useful for a new library of indexing functions to isolate programs from the complexity of array storage, enabling the library of index functions to maintain the array in local, distributed, or virtual memory.

With the invention less cache memory is wasted. Also, the central processing unit is not required to perform address translation. With the invention, the array address optimization is not performed by the compiler, instead the array address is optimized regardless of the type of compiler used. The array address optimization could occur in hardware as shown by the apparatus. During execution of the method, only needed data is placed in the cache.

Additional advantages of the invention include savings of cache memory without the need for additional hardware. Further, cache reloads are reduced due to the data compression format which results in overall improved system performance. The regular, predictable address calculation may be used to prefetch array data.

With the foregoing method and structure, the present invention dramatically reduces the storage requirements for patterned sparse arrays and may be implemented in either data cache management co-processor hardware or software. Further, the invention reduces storage requirements from 20% to 67% when compared to conventional products.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of storing and accessing a patterned array of data for use with a storage device and a processing device, comprising the steps of:
   inputting said array, an upper bandwidth and a lower bandwidth into said processing device,
   defining a band within said array based on said upper bandwidth and said lower bandwidth, wherein an area of said array outside said band contains data elements having zero value;
   storing said upper bandwidth, said lower bandwidth and data within said band in said storage device; and
   reproducing said array based on said upper bandwidth, said lower bandwidth and said data within said band such that said array includes data elements having nonzero values.

2. A method as in claim 1, further comprising steps of:
   inputting an index vector; and
   reproducing a portion of said array based on said index vector.

3. A method as in claim 2, wherein:
   said index vector includes a skip value for skipping data elements in said array and for reproducing a specific element in said array;
   a drop number comprises said skip value reduced by one of said upper bandwidth and said lower bandwidth;
   a last skipped data element comprises a data element of said data elements corresponding to said skip value,
   a take data element is adjacent said last skipped data element; and
   said step of reproducing a portion of said array comprises:
      skipping said drop number of data elements stored in said storage device, and reproducing said take data element.

4. A method as in claim 1, further comprising steps of:
   inputting a symmetric indicator;
   determining whether said array comprises a symmetric array based on said symmetric indicator;
   storing a portion of said band based on said determining step.

5. A method as in claim 4, further comprising steps of:
   inputting an index vector;
   determining whether said index vector is accessing a second portion of said band outside said portion of said band;
   if said index vector is accessing said second portion of said band, inverting said index vector and producing an inverted index vector; and
   outputting data corresponding to said inverted index vector.

6. A method as in claim 1, wherein a non-stored element comprises a data element of said data elements having zero value located in said area of said array outside said band, said method further comprising steps of:
   inputting an index vector and a shape indicator;
   determining whether said array comprises a one-dimensional array based on a composition of said index vector and a composition of said shape indicator;
   if said array comprises said one-dimensional array, determining whether said index vector is accessing said non-stored element based on said upper bandwidth and said lower bandwidth; and
   if said index vector is accessing said non-stored element in said one-dimensional array, outputting a zero.

7. A method as in claim 1, further comprising steps of:
   inputting a shape indicator; and
   determining whether said array comprises a vector array based on said shape indicator,
   wherein, if said array comprises said vector array, said reproducing step includes reproducing a first number of zero values equal to said upper bandwidth prior to reproducing said data stored in said storage device and includes reproducing a second number of zero values equal to said lower bandwidth after reproducing said data stored in said storage device.

8. A method as in claim 7, wherein said reproducing step includes reproducing a predetermined number of data elements within said array.

9. A method as in claim 1, further comprising steps of:
   inputting a shape indicator; and
   determining whether said array comprises a multi-dimensional array based on said shape indicator, said multi-dimensional array being stored in said storage device in rows; and
   if said array comprises said multi-dimensional array, for each row of said rows said reproducing step includes reproducing a first number of zero values based on said upper bandwidth prior to reproducing said data stored in said row and reproduces a second number of zero values based on said lower bandwidth after reproducing said data stored in said row.

10. A method as in claim 9, further comprising steps of:

inputting an index vector; and skipping a predetermined number of said rows based on said index vector.

11. An apparatus for storing and accessing an array of data, comprising:

means for inputting array structure information;

means, operatively connected to said means for inputting, for defining a band of said array, wherein areas of said array outside said band contain data elements having a zero value;

means, operatively connected to said means for inputting, for storing said band; and means, operatively connected to said means for storing, for reproducing said array based on said band and said array structure information.

12. An apparatus as in claim 11, wherein said means for inputting includes means for inputting an upper bandwidth and a lower bandwidth;

said means for defining comprising a SparceAdj take unit and a SparceAdj drop unit, both of said SparceAdj take unit and said SparceAdj drop unit being operatively connected to said means for inputting, said SparceAdj take unit and said SparceAdj drop unit defining said band based on said upper bandwidth and said lower bandwidth.

13. An apparatus as in claim 11, wherein:

said means for inputting including means for inputting an index vector, wherein said index vector includes instructions for skipping portions of said array and for reproducing portions of said array; and said means for reproducing said array comprising:

means, operatively connected to said means for storing, for ignoring said instructions to skip based on said band;

means, operatively connected to said means for storing, for reproducing said data within said band; and means, operatively connected to said means for defining, for reproducing zero value data elements for said areas of said array outside said band.

14. An apparatus as in claim 13, wherein said means for ignoring comprises a SparceAdj drop unit.

15. An apparatus as in claim 13, wherein said means for reproducing said data comprises a SparceAdj take unit.

16. An apparatus as in claim 13, wherein said means for reproducing zero data value elements comprises a CheckFor0's unit.

17. An apparatus as in claim 11, wherein said means for inputting includes means for inputting an index vector and a symmetric indicator, said apparatus further comprising:

means, operatively connected to said means for inputting, for determining whether said array comprises a symmetric array based on said symmetric indicator, wherein, if said array comprises said symmetric array, said means for storing stores a portion of said band and said means for determining inverts said index vector to reproduce said array.

18. An apparatus as in claim 17, wherein said means for determining comprises a SetupSym unit.

19. An apparatus as in claim 11, wherein said means for inputting includes means for inputting an index vector and shape information, said apparatus further comprising a state machine operatively connected to said means for inputting and said means for defining, said state machine controlling said means for defining such that said means for defining sequentially generates addresses of data elements of said array based on said shape information and said index vector, said means for defining generating addresses of data elements within said band and reproducing said zero value data relating to said data elements outside said band.

20. An apparatus as in claim 19, wherein said means for inputting includes means for inputting symmetric information, said apparatus further comprising means, operatively connected to said means for inputting, for determining whether said array comprises a symmetric array based on said symmetric indicator, wherein, if said array comprises said symmetric array, said means for determining generates addresses of a portion of said data elements within said band based on said index vector in an inverted form.

21. A program storage device readable by machine, tangibly embodying a program of instructions executable by the machine to perform method steps for storing and accessing a patterned array of data for use with a storage device and a processing device, said method steps comprising:

inputting said array, an upper bandwidth and a lower bandwidth into said processing device;

defining a band within said array based on said upper bandwidth and said lower bandwidth, wherein an area of said array outside said band contains data elements having zero value;

storing said upper bandwidth, said lower bandwidth and data within said band in said storage device; and reproducing said array based on said upper bandwidth, said lower bandwidth and said data within said band such that said array includes data elements having nonzero values.

* * * * *